US012659813B2

(12) United States Patent
Damnjanovic et al.

(10) Patent No.: US 12,659,813 B2
(45) Date of Patent: Jun. 16, 2026

(54) CONTROL SIGNALING FOR SPECIAL CELL MOBILITY

(71) Applicant: QUALCOMM Incorporated, San Diego, CA (US)

(72) Inventors: Jelena Damnjanovic, Del Mar, CA (US); Shanyu Zhou, San Diego, CA (US); Changhwan Park, San Diego, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 17/876,964

(22) Filed: Jul. 29, 2022

(65) Prior Publication Data

US 2024/0040444 A1     Feb. 1, 2024

(51) Int. Cl.
*H04W 36/00*          (2009.01)
(52) U.S. Cl.
CPC .............................. *H04W 36/0055* (2013.01)
(58) Field of Classification Search
CPC ......... H04W 36/0055; H04W 36/0069; H04W 36/0061; H04W 36/08
See application file for complete search history.

(56) References Cited

U.S. PATENT DOCUMENTS

2022/0167445 A1* 5/2022 Wang .................... H04W 76/27
2024/0073748 A1* 2/2024 Li .......................... H04W 24/10

FOREIGN PATENT DOCUMENTS

WO     WO-2021066700 A1     4/2021

OTHER PUBLICATIONS

3GPP TS 38.214: "3rd Generation Partnership Project; Technical Specification Group Radio Access Network, NR, Physical layer procedures for data (Release 17)", 3GPP Standard, Technical Specification, 3rd Generation Partnership Project (3GPP), Mobile Competence Centre, 650, Route Des Lucioles, F-06921 ,Sophia-Antipolis Cedex, France vol. RAN WG1, No. V17.2.0, Jun. 23, 2022, pp. 1-229, XP052183196, Paragraph [5.2.1.5].

(Continued)

*Primary Examiner* — Yemane Mesfin
*Assistant Examiner* — Jia Hao Deng
(74) *Attorney, Agent, or Firm* — Holland & Hart LLP

(57)          ABSTRACT

Methods, systems, and devices for wireless communications are described. In some systems, a network entity may configure a user equipment (UE) with a set of cells supporting Layer 1 (L1) mobility, Layer 2 (L2) mobility, or both for special cells (SpCells). The network entity may transmit a control signal, such as a medium access control (MAC) control element (CE) or a downlink control information (DCI) message, to the UE to update an SpCell. The control signal may include a cell identifier (ID) indicating which cell to set as the SpCell. Additionally, the control signal may include a transmission/reception point (TRP) ID indicating which TRP to set as the primary TRP (pTRP) for the SpCell. In response to the control signal, the UE may switch from a current SpCell to the cell indicated by the control signal and may communicate with the network via the pTRP of the new SpCell.

30 Claims, 18 Drawing Sheets

(56) References Cited

OTHER PUBLICATIONS

3GPP TS 38.331: "3rd Generation Partnership Project, Technical Specification Group Radio Access Network, NR, Radio Resource Control (RRC) protocol specification (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 19, 2022, pp. 1-1273, XP052183757, Chapter 5.5 Measurements, paragraph [5.3.5.5.7].

International Search Report and Written Opinion—PCT/US2023/069714—ISA/EPO—Nov. 2, 2023 (2205242WO).

Qualcomm Incorporated: "Beam Aware RACH Procedure and Beam Refinement During Handover", 3GPP TSG-RAN WG2 Meeting #99, R2-1709091, 3rd Generation Partnership Project, Mobile Competence Centre, 650, Route Des Lucioles, F-06921 Sophia-Antipolis Cedex, France, Aug. 21-25, 2017, XP051318883, 7 Pages, 3GPP Server Laid Open Date Aug. 12, 2017, section 2, Paragraph [0002].

* cited by examiner

710

720

715

705

700

Communications Manager

Cell Configuration Component

825

Receiver

810

SpCell Mobility Component

830

Transmitter

815

Communication Component

835

820

805

800

1110

1120

1115

1105

1100

130        105        115

Network
Entity

Transceiver        Antenna 1410        1415

Communications
Manager

Memory

Code

1430

1420        1425

1440

Processor

1435

1405

1400

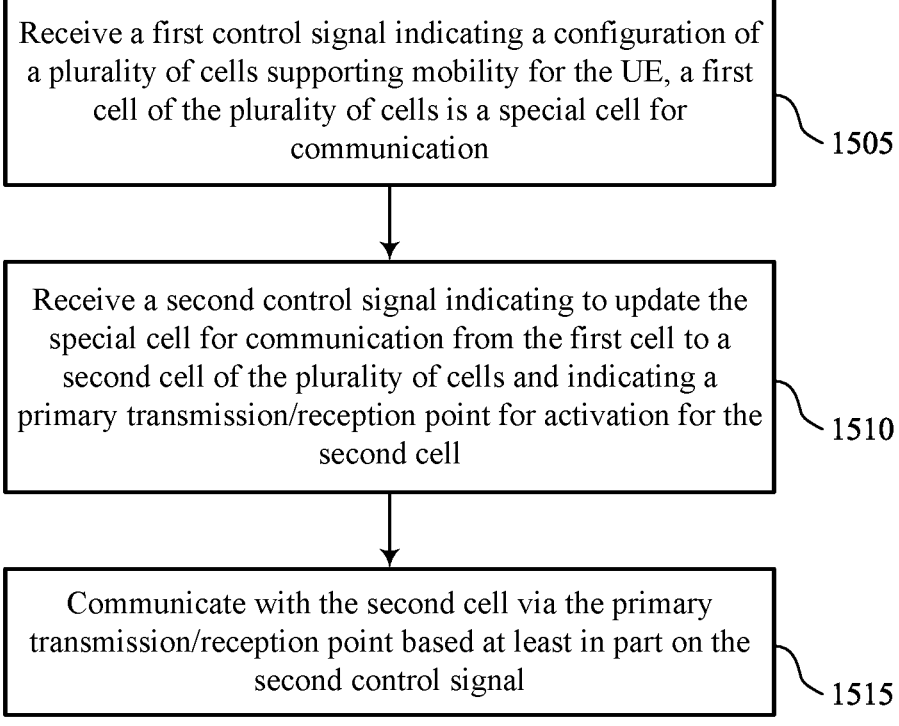

Receive a first control signal indicating a configuration of a plurality of cells supporting mobility for the UE, a first cell of the plurality of cells is a special cell for communication

1505

Receive a second control signal indicating to update the special cell for communication from the first cell to a second cell of the plurality of cells and indicating a primary transmission/reception point for activation for the second cell

1510

Communicate with the second cell via the primary transmission/reception point based at least in part on the second control signal

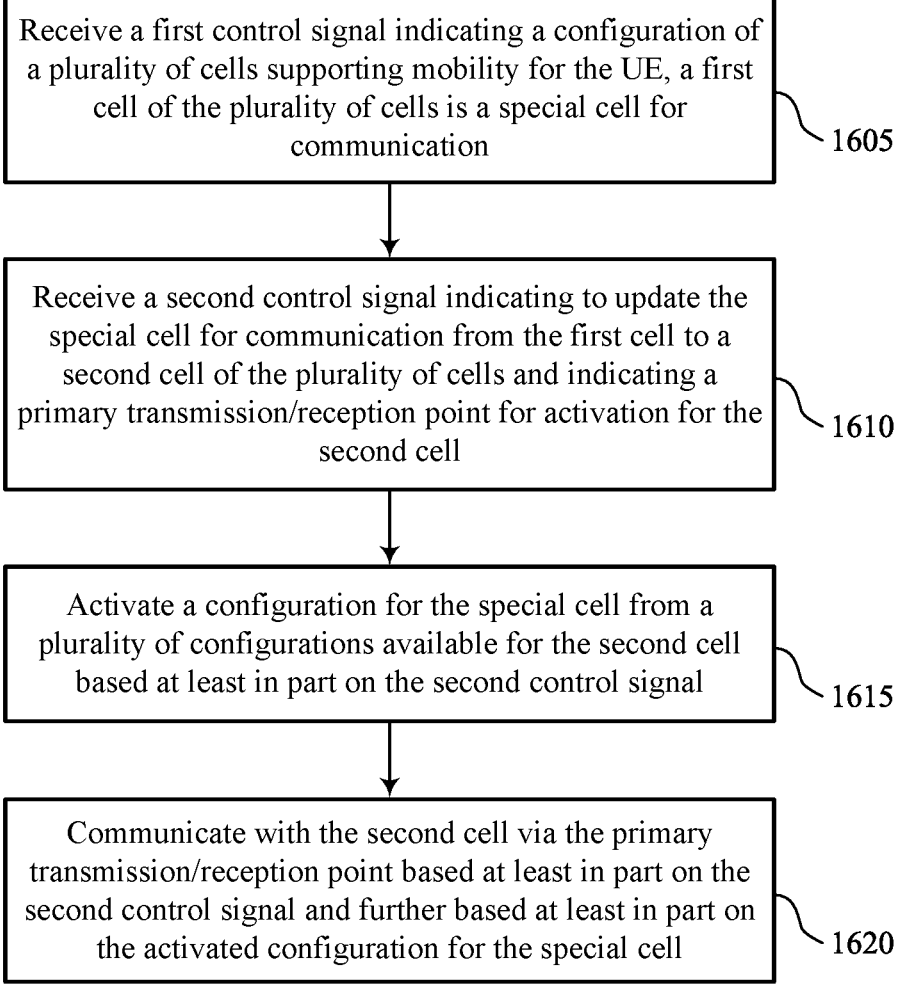

Receive a first control signal indicating a configuration of a plurality of cells supporting mobility for the UE, a first cell of the plurality of cells is a special cell for communication 〜1605

Receive a second control signal indicating to update the special cell for communication from the first cell to a second cell of the plurality of cells and indicating a primary transmission/reception point for activation for the second cell 〜1610

Activate a configuration for the special cell from a plurality of configurations available for the second cell based at least in part on the second control signal 〜1615

Communicate with the second cell via the primary transmission/reception point based at least in part on the second control signal and further based at least in part on the activated configuration for the special cell 〜1620

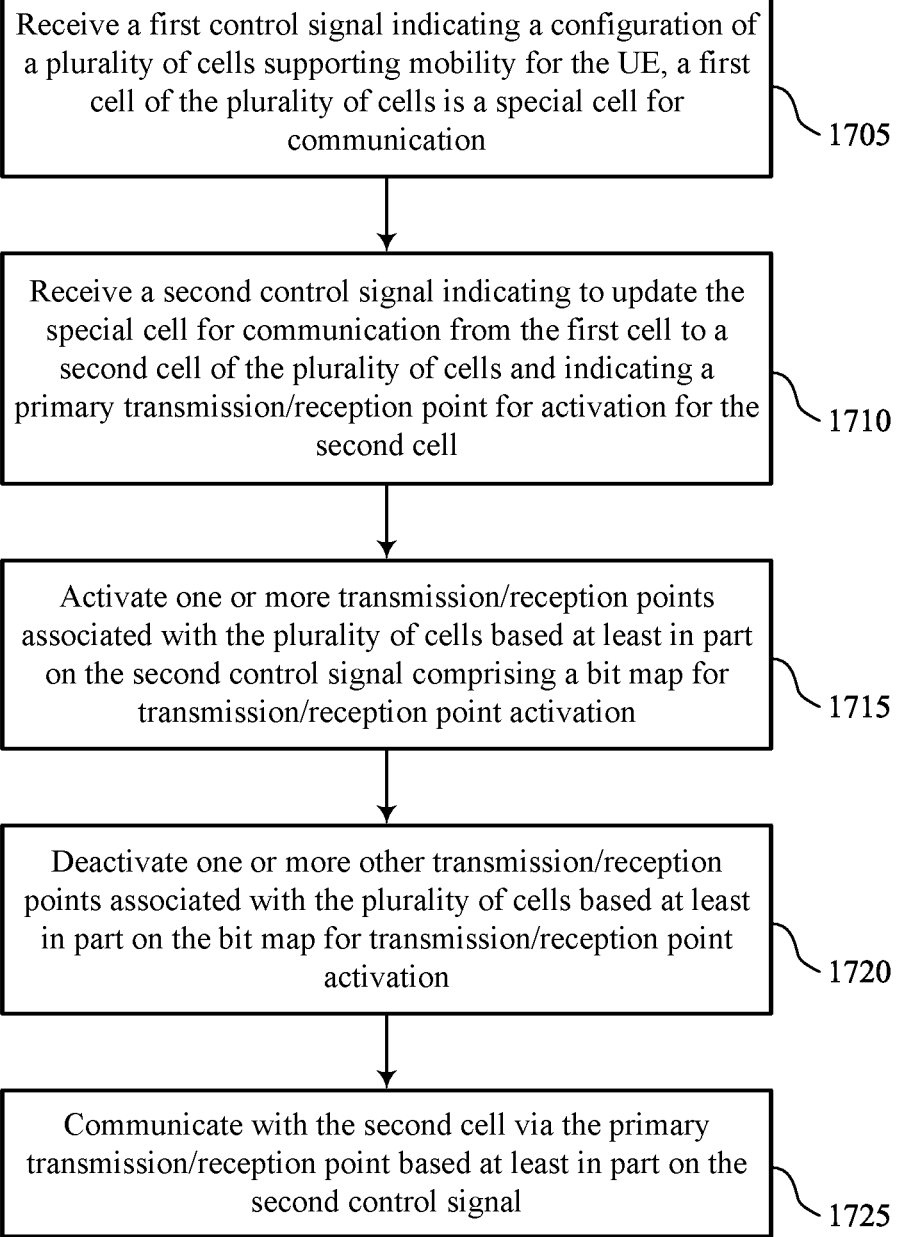

Receive a first control signal indicating a configuration of a plurality of cells supporting mobility for the UE, a first cell of the plurality of cells is a special cell for communication

1705

Receive a second control signal indicating to update the special cell for communication from the first cell to a second cell of the plurality of cells and indicating a primary transmission/reception point for activation for the second cell

1710

Activate one or more transmission/reception points associated with the plurality of cells based at least in part on the second control signal comprising a bit map for transmission/reception point activation

1715

Deactivate one or more other transmission/reception points associated with the plurality of cells based at least in part on the bit map for transmission/reception point activation

1720

Communicate with the second cell via the primary transmission/reception point based at least in part on the second control signal

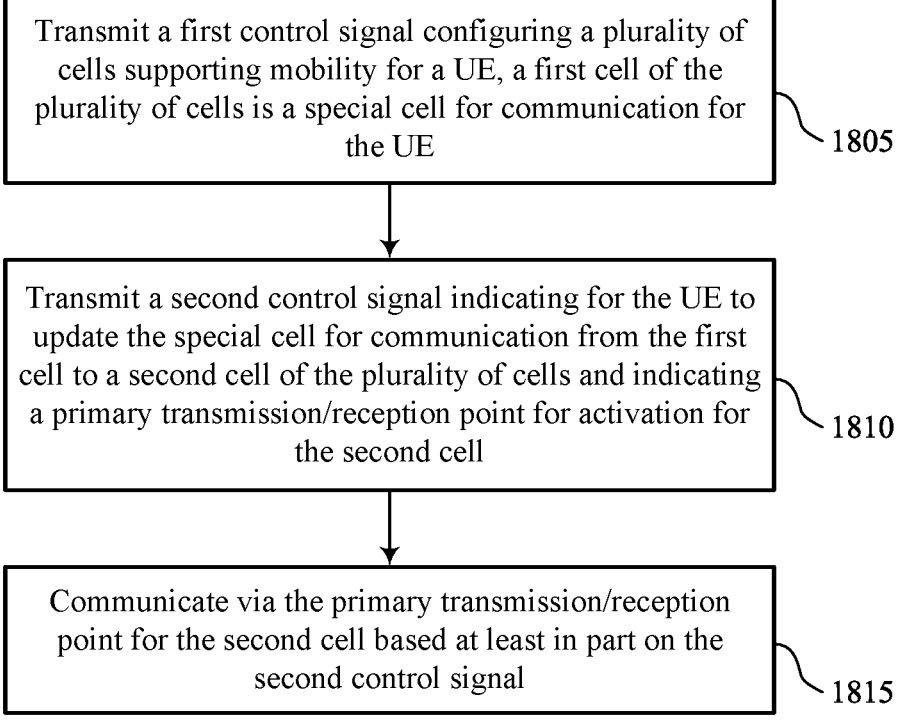

Transmit a first control signal configuring a plurality of cells supporting mobility for a UE, a first cell of the plurality of cells is a special cell for communication for the UE

1805

Transmit a second control signal indicating for the UE to update the special cell for communication from the first cell to a second cell of the plurality of cells and indicating a primary transmission/reception point for activation for the second cell

1810

Communicate via the primary transmission/reception point for the second cell based at least in part on the second control signal

CONTROL SIGNALING FOR SPECIAL CELL MOBILITY

FIELD OF TECHNOLOGY

The following relates to wireless communications, including control signaling for special cell (SpCell) mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may communicate with the network via a special cell (SpCell). SpCell configuration and SpCell reconfiguration may be supported by Layer 3 (L3) signaling, such as radio resource control (RRC) signaling. However, in some cases, using L3 signaling—such as handover signaling in a handover procedure—to manage UE SpCell mobility from a first cell to a second cell may introduce significant latency and signaling overhead into the system. Such signaling may fail to support some relatively low latency or relatively high mobility procedures in a wireless communications system.

SUMMARY

The described techniques relate to improved methods, systems, devices, and apparatuses that support control signaling for special cell (SpCell) mobility. For example, the described techniques provide for relatively low latency signaling (e.g., Layer 1 (L1) or Layer 2 (L2) signaling) for SpCell mobility. A network entity may transmit a control signal, such as a medium access control (MAC) control element (CE) or a downlink control information (DCI) message, to a user equipment (UE) to update an SpCell of the UE. For example, the control signal may include a cell identifier (ID) indicating which cell to set as the SpCell. Additionally, the control signal may include a transmission/reception point (TRP) ID indicating which TRP to set as the primary TRP (pTRP) for the SpCell. In response to receiving the control signal, the UE may switch from a current SpCell to the SpCell indicated by the control signal (e.g., corresponding to the cell ID). The UE may communicate with the network via the pTRP of the new SpCell. By using L1 or L2 signaling to trigger the SpCell mobility, as opposed to using Layer 3 (L3) signaling to reconfigure a cell as the SpCell, the network may reduce the latency involved in updating the SpCell, supporting relatively high mobility between cells in a wireless communications system.

A method for wireless communications at a UE is described. The method may include receiving a first control signal indicating a configuration of a set of multiple cells supporting mobility for the UE, where a first cell of the set of multiple cells is an SpCell for communication, receiving a second control signal indicating to update the SpCell for communication from the first cell to a second cell of the set of multiple cells and indicating a pTRP for activation for the second cell, and communicating with the second cell via the pTRP based on the second control signal.

An apparatus for wireless communications at a UE is described. The apparatus may include a processor, memory coupled with the processor, and instructions stored in the memory. The instructions may be executable by the processor to cause the apparatus to receive a first control signal indicating a configuration of a set of multiple cells supporting mobility for the UE, where a first cell of the set of multiple cells is an SpCell for communication, receive a second control signal indicating to update the SpCell for communication from the first cell to a second cell of the set of multiple cells and indicating a pTRP for activation for the second cell, and communicate with the second cell via the pTRP based on the second control signal.

Another apparatus for wireless communications at a UE is described. The apparatus may include means for receiving a first control signal indicating a configuration of a set of multiple cells supporting mobility for the UE, where a first cell of the set of multiple cells is an SpCell for communication, means for receiving a second control signal indicating to update the SpCell for communication from the first cell to a second cell of the set of multiple cells and indicating a pTRP for activation for the second cell, and means for communicating with the second cell via the pTRP based on the second control signal.

A non-transitory computer-readable medium storing code for wireless communications at a UE is described. The code may include instructions executable by a processor to receive a first control signal indicating a configuration of a set of multiple cells supporting mobility for the UE, where a first cell of the set of multiple cells is an SpCell for communication, receive a second control signal indicating to update the SpCell for communication from the first cell to a second cell of the set of multiple cells and indicating a pTRP for activation for the second cell, and communicate with the second cell via the pTRP based on the second control signal.

In some examples of the method, apparatuses, and non-transitory computer-readable medium described herein, the second control signal further indicates a configuration for the SpCell and the method, apparatuses, and non-transitory computer-readable medium may include further operations, features, means, or instructions for activating the configuration for the SpCell from a set of multiple configurations available for the second cell based on the second control signal, where the communicating may be further based on the activated configuration for the SpCell.

In some examples of the method, apparatuses, and non-transitory computer-readable medium described herein, the second cell may be deactivated based on the first control signal, and the second control signal further indicates an identifier of a channel state information reference signal for tracking (TRS) based on the second cell being deactivated, and the method, apparatuses, and non-transitory computer-readable medium may include further operations, features, means, or instructions for activating the second cell in response to receiving the second control signal and performing beam refinement for the second cell based on the identifier of the TRS.

In some examples of the method, apparatuses, and non-transitory computer-readable medium described herein, the identifier of the TRS corresponds to a set of multiple TRPs for the second cell, and the identifier of the TRS indicates one or more transmission configuration indicator (TCI) states to activate for the second cell, one or more reference signals for beam refinement for the second cell, or both.

Some examples of the method, apparatuses, and non-transitory computer-readable medium described herein may further include operations, features, means, or instructions for deactivating one or more cells based on the second control signal further indicating the one or more cells to deactivate.

In some examples of the method, apparatuses, and non-transitory computer-readable medium described herein, the second control signal indicates one or more L1 measurement identifiers and reporting configurations corresponding to the one or more cells to deactivate, one or more TRPs associated with the one or more cells to deactivate, or a combination thereof.

In some examples of the method, apparatuses, and non-transitory computer-readable medium described herein, deactivating the one or more cells may include operations, features, means, or instructions for deactivating a set of multiple TRPs associated with the one or more cells.

Some examples of the method, apparatuses, and non-transitory computer-readable medium described herein may further include operations, features, means, or instructions for activating one or more additional TRPs associated with the second cell based on the second control signal indicating to update the SpCell for communication with the second cell.

Some examples of the method, apparatuses, and non-transitory computer-readable medium described herein may further include operations, features, means, or instructions for activating one or more TRPs associated with the set of multiple cells based on the second control signal including a bit map for TRP activation.

Some examples of the method, apparatuses, and non-transitory computer-readable medium described herein may further include operations, features, means, or instructions for deactivating one or more other TRPs associated with the set of multiple cells based on the bit map for TRP activation.

In some examples of the method, apparatuses, and non-transitory computer-readable medium described herein, the second control signal includes a logical channel identifier (LCID) indicating that the second control signal configures the UE to switch the SpCell from the first cell to the second cell, or the second control signal corresponds to a DCI format indicating that the second control signal configures the UE to switch the SpCell from the first cell to the second cell.

In some examples of the method, apparatuses, and non-transitory computer-readable medium described herein, the second control signal further includes a set of reserved bits indicating which fields may be present within the second control signal, indicating to deactivate the first cell configured as the SpCell for communication, indicating to maintain the first cell configured as the SpCell for communication as active, or a combination thereof.

In some examples of the method, apparatuses, and non-transitory computer-readable medium described herein, the first control signal configures a first pTRP for the second cell from a set of multiple TRPs associated with the second cell, and the pTRP for activation for the second cell indicated using the second control signal includes a second pTRP from the set of multiple TRPs different from the first pTRP.

In some examples of the method, apparatuses, and non-transitory computer-readable medium described herein, the first control signal includes a radio resource control (RRC) signal, and the second control signal includes a MAC-CE, a DCI signal, or both.

A method for wireless communications at a network entity is described. The method may include transmitting a first control signal configuring a set of multiple cells supporting mobility for a UE, where a first cell of the set of multiple cells is an SpCell for communication for the UE, transmitting a second control signal indicating for the UE to update the SpCell for communication from the first cell to a second cell of the set of multiple cells and indicating a pTRP for activation for the second cell, and communicating via the pTRP for the second cell based on the second control signal.

An apparatus for wireless communications at a network entity is described. The apparatus may include a processor, memory coupled with the processor, and instructions stored in the memory. The instructions may be executable by the processor to cause the apparatus to transmit a first control signal configuring a set of multiple cells supporting mobility for a UE, where a first cell of the set of multiple cells is an SpCell for communication for the UE, transmit a second control signal indicating for the UE to update the SpCell for communication from the first cell to a second cell of the set of multiple cells and indicating a pTRP for activation for the second cell, and communicate via the pTRP for the second cell based on the second control signal.

Another apparatus for wireless communications at a network entity is described. The apparatus may include means for transmitting a first control signal configuring a set of multiple cells supporting mobility for a UE, where a first cell of the set of multiple cells is an SpCell for communication for the UE, means for transmitting a second control signal indicating for the UE to update the SpCell for communication from the first cell to a second cell of the set of multiple cells and indicating a pTRP for activation for the second cell, and means for communicating via the pTRP for the second cell based on the second control signal.

A non-transitory computer-readable medium storing code for wireless communications at a network entity is described. The code may include instructions executable by a processor to transmit a first control signal configuring a set of multiple cells supporting mobility for a UE, where a first cell of the set of multiple cells is an SpCell for communication for the UE, transmit a second control signal indicating for the UE to update the SpCell for communication from the first cell to a second cell of the set of multiple cells and indicating a pTRP for activation for the second cell, and communicate via the pTRP for the second cell based on the second control signal.

In some examples of the method, apparatuses, and non-transitory computer-readable medium described herein, the second control signal further indicates a configuration for the SpCell and the method, apparatuses, and non-transitory computer-readable medium may include further operations, features, means, or instructions for activating the configuration for the SpCell from a set of multiple configurations available for the second cell based on the second control signal, where the communicating may be further based on the activated configuration for the SpCell.

Some examples of the method, apparatuses, and non-transitory computer-readable medium described herein may further include operations, features, means, or instructions for generating a bit map for TRP activation indicating one or more TRPs associated with the set of multiple cells for the UE to activate, where the second control signal further includes the bit map.

In some examples of the method, apparatuses, and non-transitory computer-readable medium described herein, the bit map further indicates one or more other TRPs associated with the set of multiple cells for the UE to deactivate.

In some examples of the method, apparatuses, and non-transitory computer-readable medium described herein, the second cell may be deactivated for the UE based on the first control signal, and the second control signal further indicates an identifier of a TRS based on the second cell being deactivated for the UE.

In some examples of the method, apparatuses, and non-transitory computer-readable medium described herein, the identifier of the TRS corresponds to a set of multiple TRPs for the second cell, and the identifier of the TRS indicates one or more TCI states to activate for the second cell, one or more reference signals for beam refinement for the second cell, or both.

In some examples of the method, apparatuses, and non-transitory computer-readable medium described herein, the second control signal further indicates one or more cells for the UE to deactivate.

In some examples of the method, apparatuses, and non-transitory computer-readable medium described herein, the second control signal indicates one or more L1 measurement identifiers and reporting configurations corresponding to the one or more cells for the UE to deactivate, one or more TRPs associated with the one or more cells for the UE to deactivate, or a combination thereof.

In some examples of the method, apparatuses, and non-transitory computer-readable medium described herein, the second control signal includes an LCID indicating that the second control signal configures the UE to switch the SpCell from the first cell to the second cell, or the second control signal corresponds to a DCI format indicating that the second control signal configures the UE to switch the SpCell from the first cell to the second cell.

In some examples of the method, apparatuses, and non-transitory computer-readable medium described herein, the second control signal further includes a set of reserved bits indicating which fields may be present within the second control signal, indicating for the UE to deactivate the first cell configured as the SpCell for communication, indicating for the UE to maintain the first cell configured as the SpCell for communication as active, or a combination thereof.

In some examples of the method, apparatuses, and non-transitory computer-readable medium described herein, the first control signal includes an RRC signal, and the second control signal includes a MAC-CE, a DCI signal, or both.

BRIEF DESCRIPTION OF THE DRAWINGS

FIGS. 15 through 18 show flowcharts illustrating methods that support control signaling for SpCell mobility in accordance with one or more aspects of the present disclosure.

DETAILED DESCRIPTION

Figure 1:
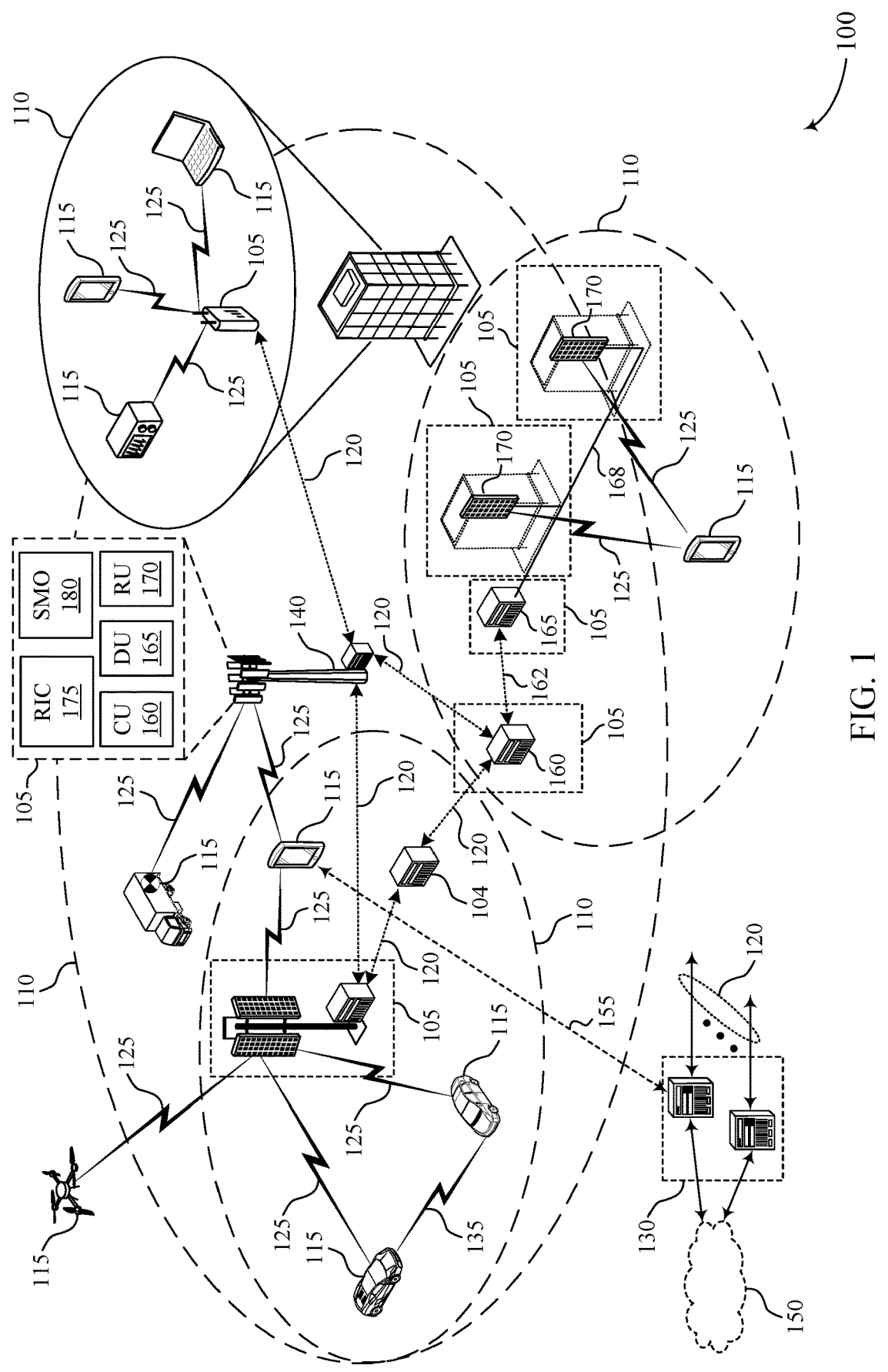
FIG. 1 illustrates an example of a wireless communications system that supports control signaling for special cell (SpCell) mobility in accordance with one or more aspects of the present disclosure.

In some wireless communications systems, the wireless network may switch which cell communicates with a user equipment (UE). For example, the UE may communicate information with the network via a special cell (SpCell), which may refer to a primary cell (PCell) for a master cell group (MCG), a primary secondary cell (PSCell) for a secondary cell group (SCG), or both. If the UE moves within the wireless communications system, the UE mobility may correspond to SpCell mobility. For example, a cell supporting a strongest connection with the UE may change based on the UE movement, changing channel conditions, changing traffic conditions, or any combination thereof. To maintain UE connectivity and a threshold performance level, the network may switch the UE from one SpCell to another. Additionally, or alternatively, if the cells are associated with multiple transmission/reception points (TRPs), the network may activate a primary TRP (pTRP) for communication for a cell. In some cases, the network may additionally activate one or more additional TRPs (aTRPs) for the cell in addition to the pTRP.

In some systems, the network may use handover procedures or other cell reconfiguration procedures to switch the SpCell for the UE. However, such procedures may involve Layer 3 (L3) signaling, such as radio resource control (RRC) signaling. Such L3 signaling may introduce latency into updating the SpCell, for example, as compared to Layer 1 (L1) or Layer 2 (L2) signaling. To improve the latency and signaling overhead associated with an SpCell update, the network may support L1 signaling, L2 signaling, or both for SpCell mobility.

In a wireless communications system, a network entity may configure a UE with a set of cells supporting L1 mobility, L2 mobility, or both for SpCells. The network entity may transmit the cell configuration information using RRC signaling. To update the SpCell for the UE, the network entity may transmit a control signal, such as a medium access control (MAC) control element (CE) or a downlink control information (DCI) message, to the UE. The control signal may include a cell identifier (ID) indicating which cell to set as the SpCell. Additionally, the control signal may include a TRP ID indicating which TRP to set as the pTRP for the SpCell. In response to receiving the control signal, the UE may switch from a current SpCell to the SpCell indicated by the control signal (e.g., corresponding to the cell ID). The UE may communicate with the network via the pTRP of the new SpCell. By using L1 or L2 signaling to trigger the SpCell mobility, as opposed to using L3 signaling, the network may reduce the latency involved in updating the SpCell for the UE.

In some examples, the control signal updating the SpCell may include additional information. For example, the control signal may indicate an SpCell configuration to apply for the new SpCell. Additionally, or alternatively, the control signal may indicate information relating to beam refinement for the new SpCell, measurement and reporting information for deactivated cells, or a combination thereof. In some cases, the control signal may support TRP-specific activation and deactivation for the UE. For example, the control signal may include a bit map indicating which TRPs to activate and which TRPs to deactivate for active cells.

Aspects of the disclosure are initially described in the context of wireless communications systems and network architectures. Additional aspects of the disclosure are described with reference to message formats and process flows. Aspects of the disclosure are further illustrated by and described with reference to apparatus diagrams, system diagrams, and flowcharts that relate to control signaling for SpCell mobility.

FIG. 1 illustrates an example of a wireless communications system 100 that supports control signaling for SpCell mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control signaling for special cell mobility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023). Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems 100 may support inter-cell beam management based on beam-based mobility. For example, a UE 115 may measure reference signals to select a beam for communication with the network. In some examples, the selected beam may be from a TRP associated with a different cell than the current serving cell (e.g., with a different physical cell identity (PCI) than the current serving cell). In some examples, the cells may correspond to different network entities 105. To communicate using the selected beam, the network may switch the UE 115 to communicate via the TRP associated with the different PCI. In some examples, a network entity 105 may use L1 signaling, L2 signaling, or both to switch UE-dedicated channels, reference signals, or both for the UE 115 to the TRP (e.g., according to a unified transmission configuration indicator (TCI) update via DCI or MAC-CE). To additionally support PCell or SpCell change to the different cell associated with the TRP, the wireless communications system may support L1 signaling, L2 signaling, or both for SpCell mobility. Switching the SpCell may allow the UE 115 to leave the coverage of the current serving cell when communicating with the TRP associated with a different cell (e.g., corresponding to a different PCI). Accordingly, the network may support UE mobility in the system, providing robust support against blocking, providing more opportunities for higher rank transmissions across different cells, or both.

The techniques described herein may support dynamic switching between different serving cells, such as different SpCells, which may include PCells, PSCells, secondary cells (SCells), or any combination thereof. The wireless communications system 100 may support the L1 signaling, L2 signaling, or both (e.g., L1/L2 signaling) for inter-cell mobility (e.g., SpCell mobility) if the UE 115 is operating in a Standalone mode, in a carrier aggregation (CA) mode, in a NR dual connectivity (NR-DC) mode, or any combination thereof. Additionally, or alternatively, the wireless communications system 100 may support L1/L2 signaling for switching between cells in an intra-DU system (e.g., switching between cells corresponding to the same DU 165), an intra-CU, inter-DU system (e.g., switching between cells corresponding to the same CU 160 but different DUs 165), in an intra-frequency group (e.g., cells corresponding to a same carrier frequency), in an inter-frequency group (e.g., cells corresponding to different carrier frequencies), or any combination thereof. The cells may be synchronized or non-synchronized and may correspond to FR1, FR2, or any other frequency region.

The L1/L2 mobility signaling may support cell activation, cell deactivation, TRP activation, TRP deactivation, SpCell update, or any combination thereof. In some examples, the wireless communications system 100 may support the L1/L2 mobility signaling for CA with multi-TRP (mTRP)

communications, intra-frequency CA, or both. Additionally, or alternatively, the wireless communications system 100 may support the L1/L2 mobility signaling for a single active cell with mTRP communication, intra-frequency CA, or both. In some cases, the wireless communications system 100 may support the L1/L2 mobility signaling without CA configured. In some examples, an active cell may switch between supporting mTRP communications and single-TRP (sTRP) communications using bandwidth part (BWP) switching techniques.

Figure 2:
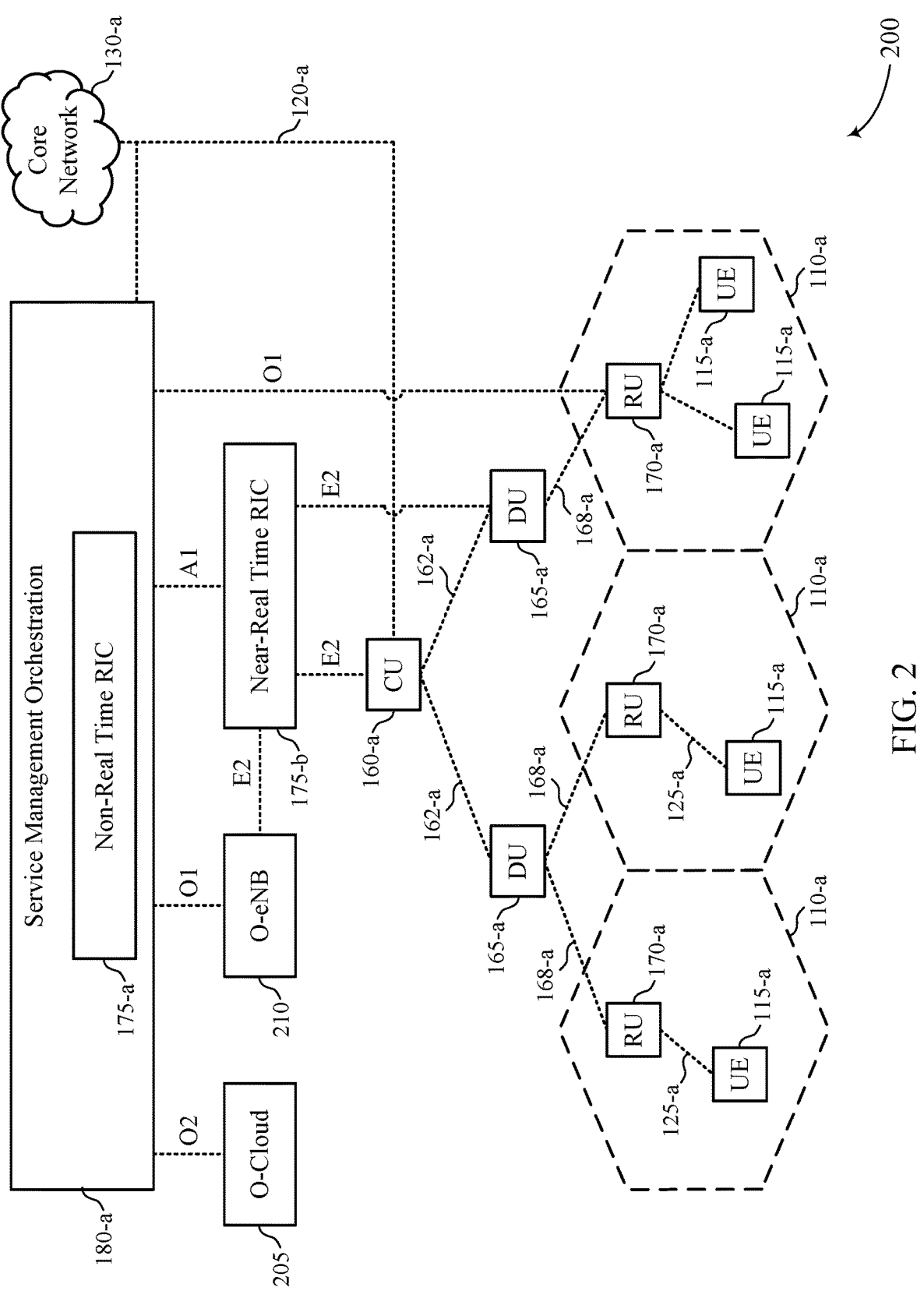
FIG. 2 illustrates an example of a network architecture that supports control signaling for SpCell mobility in accordance with one or more aspects of the present disclosure.

FIG. 2 illustrates an example of a network architecture 200 that supports control signaling for SpCell mobility in accordance with one or more aspects of the present disclosure. The network architecture 200 (e.g., a disaggregated base station architecture, a disaggregated RAN architecture) may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

The network architecture 200 may support L1/L2 mobility. For example, a UE 115-*a* may move between coverage areas 110-*a* for different cells of a configured cell set for L1/L2 mobility. The different cells may correspond to different RUs 170-*a* (e.g., different network entities). In some examples, an RU 170-*a* may have multi-carrier support, effectively supporting multiple cells (e.g., N cells). In some such examples, activation and deactivation may be performed on groups of carriers (e.g., groups of cells), such as activating or deactivating a group of cells corresponding to a same RU 170-*a*. In some cases, the configured cell set for L1/L2 mobility may correspond to cells associated with a same DU 165-*a*. Alternatively, the configured cell set for L1/L2 mobility may correspond to cells associated with different DUs 165-*a* but a same CU 160-*a*. In yet other cases, the configured cell set for L1/L2 mobility may correspond to cells associated with different CUs 160-*a*. To support the L1/L2 mobility, a network entity (e.g., an RU 170-*a*, a DU 165-*a*, a CU 160-*a*, or some combination thereof) may transmit an L1/L2 signal (e.g., a MAC-CE, a DCI message) indicating a new SpCell to the UE 115-*a* to use for communications with the network.

Figure 3:
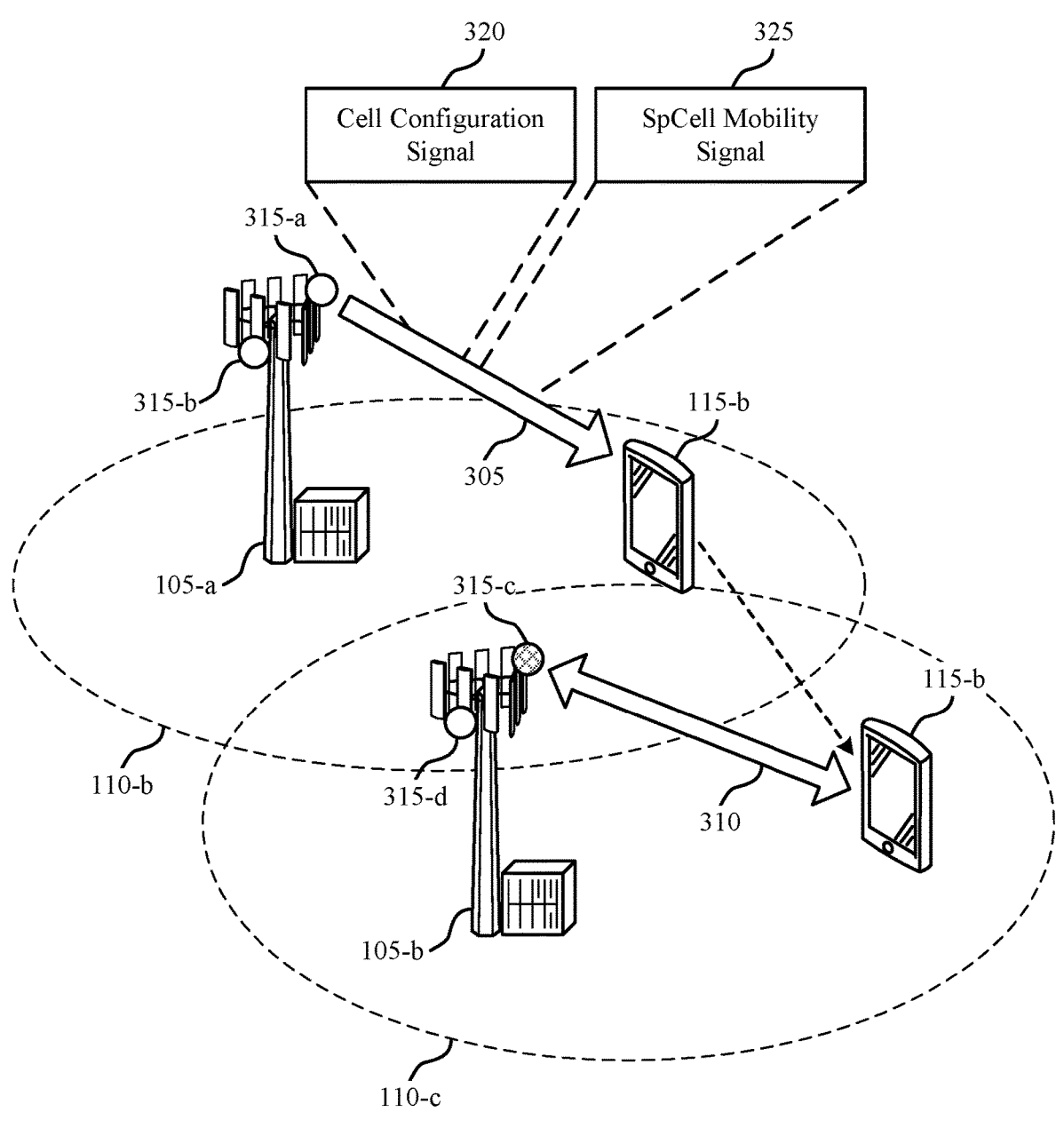
FIG. 3 illustrates an example of a wireless communications system that supports control signaling for SpCell mobility in accordance with one or more aspects of the present disclosure.

FIG. 3 illustrates an example of a wireless communications system 300 that supports control signaling for SpCell mobility in accordance with one or more aspects of the present disclosure. The wireless communications system 300 may include or be an example of a wireless communications system 100, a network architecture 200, or both as described herein with reference to FIGS. 1 and 2. The wireless communications system 300 may include a UE 115-*b*, a network entity 105-*a*, and a network entity 105-*b*, which may be examples of the corresponding devices described with reference to FIGS. 1 and 2. The wireless communications system 300 may support the UE 115-*b* switching SpCells, for example, based on mobility of the UE 115-*b* (e.g., from a first geographic coverage area 110-*b* to a second geographic coverage area 110-*c*).

The network entity 105-*a* may configure the UE 115-*b* with a set of cells for communication using a cell configuration signal 320. For example, the network entity 105-*a* may transmit the cell configuration signal 320 via a downlink channel 305 to the UE 115-*b*. In some cases, the network entity 105-*a* may indicate that the set of cells or a subset of the cells configured for the UE 115-*b* support L1 mobility, L2 mobility, or both (e.g., L1/L2 mobility). For example, the network entity 105-*a* may use RRC signaling to configure an L1/L2 mobility configured cell set for the UE 115-*b*. The UE 115-*b* may receive the cell configuration signal 320 and may store information relating to the list of cells in the L1/L2 mobility configured cell set. Additionally, or alternatively, the network entity 105-*a* may use the cell configuration signal 320 or other RRC signaling to activate one or more cells, deactivate one or more cells, or both.

In some examples, the cell configuration signal 320 may configure one or more SpCell configurations for the cells in the L1/L2 mobility configured cell set. Additionally, the cells in the L1/L2 mobility configured cell set may be on the same or different carrier frequencies (e.g., as indicated by the cell configuration signal 320). By configuring the cells in the L1/L2 mobility configured cell set, the network and the UE 115-*b* may support updating an SpCell from the set using L1 signaling, L2 signaling, or a combination thereof. For example, the L1/L2 mobility configured cell set may support using MAC-CE signaling, DCI signaling, or both to update SpCells and active TRPs among the activated cells.

The L1/L2 mobility configured cell set may include an L1/L2 mobility activated cell set, an L1/L2 mobility deactivated cell set, a candidate L1/L2 mobility cell set, or any combination thereof. The L1/L2 mobility activated cell set may include a group of one or more serving cells that are currently activated. The UE 115-*b* may use such cells for data transfer, control information transfer, or both. Additionally, the network may support PCell updates, SpCell updates or both for the L1/L2 mobility activated cells using L1 signaling, L2 signaling, or a combination thereof. In some cases, the UE 115-*b* may be associated with a UE capability supporting a single active cell at a time. In some such cases, the L1/L2 mobility activated cell set may include one active cell (e.g., a first cell). If the network activates a second cell for the UE 115-*b* from the L1/L2 mobility configured cell set, the UE 115-*b* may automatically deactivate the first cell and perform a PCell switch to the second cell to maintain a single active cell in the L1/L2 mobility activated cell set. The L1/L2 mobility deactivated cell set may include a group of one or more serving cells from the L1/L2 mobility configured cell set that currently do not support data transfer, control information transfer, or both for the UE 115-*b*. However, the network may activate such cells for the UE 115-*b*, perform a PCell update for such cells for the UE 115-*b*, or both using L1 signaling, L2 signaling, or a combination thereof. Additionally, or alternatively, the network may support L1 measurement reporting for the deactivated cells in the L1/L2 mobility deactivated cell set, such that the UE 115-*b* may monitor for channel metrics associated with the deactivated cells. Based on the L1 measurement reporting from the UE 115-*b*, the network may determine whether to activate a currently deactivated cell from the L1/L2 mobility configured cell set (e.g., based on one or more channel metrics, thresholds, or both). The candidate L1/L2 mobility cell set may include a group of one or more serving cells that the UE 115-*b* may autonomously activate using L1 signaling, L2 signaling, or both (e.g., without receiving control signaling from the network to trigger the cell activation). In some examples, the candidate cells may support conditional L1/L2-based PCell change for the UE 115-*b*.

In some cases, the cell configuration signal 320 may set a first cell as the current SpCell for the UE 115-*b*. For example, the network may assign the first cell as the PCell for an MCG and as the PSCell for an SCG. Accordingly, the UE 115-*b* may communicate with the network via the first cell. In some examples, the network entity 105-*a* may serve the first cell corresponding to a geographic coverage area 110-*b*. For example, the network entity 105-*a* may be an example of an RU, a DU, or a combination thereof. The network entity 105-*a* may additionally include one or more TRPs, such as a first TRP 315-*a* and a second TRP 315-*b*.

The network entity 105-*a* may communicate with the UE 115-*b* via the first TRP 315-*a*. The UE 115-*b* may perform beamforming and beam refinement to support beam-based communications with the first TRP 315-*a* of the network entity 105-*a* corresponding to the first cell.

The network may determine to switch the UE 115-*b* to a new SpCell using L1/L2 signaling. For example, the UE 115-*b* may move from within a geographic coverage area 110-*b* associated with the first cell to within a geographic coverage area 110-*c* associated with a second cell (e.g., corresponding to the network entity 105-*b*, such as an RU, a DU, or a combination thereof). Additionally, or alternatively, changing channel conditions, traffic, or other parameters may trigger an SpCell switch for the UE 115-*b*.

The network (e.g., via the network entity 105-*a*, the network entity 105-*b*, or some other network entity) may transmit an SpCell mobility signal 325 to the UE 115-*b* to switch the SpCell for the UE 115-*b*. For example, the network entity 105-*a* corresponding to the current SpCell may transmit the SpCell mobility signal 325 indicating a new SpCell for the UE 115-*b*. The UE 115-*b* may receive the SpCell mobility signal 325 and may switch to communicating with the network via a new SpCell indicated by the SpCell mobility signal 325. For example, the UE 115-*b* may switch to communicate with the network via the network entity 105-*b* using a communication link 310 in response to the SpCell mobility signal 325. The SpCell mobility signal 325 may be an example of a control signal, such as an L1 or L2 control signal. For example, the SpCell mobility signal 325 may be an example of a MAC-CE, a DCI signal, or some combination thereof.

The SpCell mobility signal 325 may indicate for the UE 115-*b* to update the SpCell for communication from the first cell to a second cell (e.g., from the L1/L2 mobility configured cell set). For example, the SpCell mobility signal 325 may include a cell ID for the second cell indicating for the UE 115-*b* to set the second cell as the SpCell for communication. Additionally, or alternatively, the SpCell mobility signal 325 may indicate a pTRP for activation for the second cell. For example, if the second cell is associated with multiple TRPs (e.g., a first TRP 315-*c* and a second TRP 315-*d*), the SpCell mobility signal 325 may indicate which TRP to use for the SpCell. As an example, the SpCell mobility signal 325 may include a TRP ID indicating the TRP 315-*c* for the second cell (e.g., corresponding to the network entity 105-*b*), and the UE 115-*b* may communicate with the network via the TRP 315-*c*. The network may configure the TRP 315-*c* as the pTRP for the new SpCell for communication with the UE 115-*b*.

In some examples, the network may fail to support per TRP activation and deactivation. For example, activating a cell may automatically activate multiple TRPs associated with the cell, while deactivating the cell may automatically deactivate the multiple TRPs associated with the cell. In some other examples, the network may support TRP-specific activation, TRP-specific deactivation, or both. For example, the network may indicate, to the UE 115-*b*, which TRPs to activate or deactivate for a cell. In some cases, the cell configuration signal 320, the SpCell mobility signal 325, or both may support TRP-level granularity for activation information, deactivation information, or both. For example, the SpCell mobility signal 325 may include a bit map for TRP activation, as described herein with reference to FIG. 5.

Figure 4B:
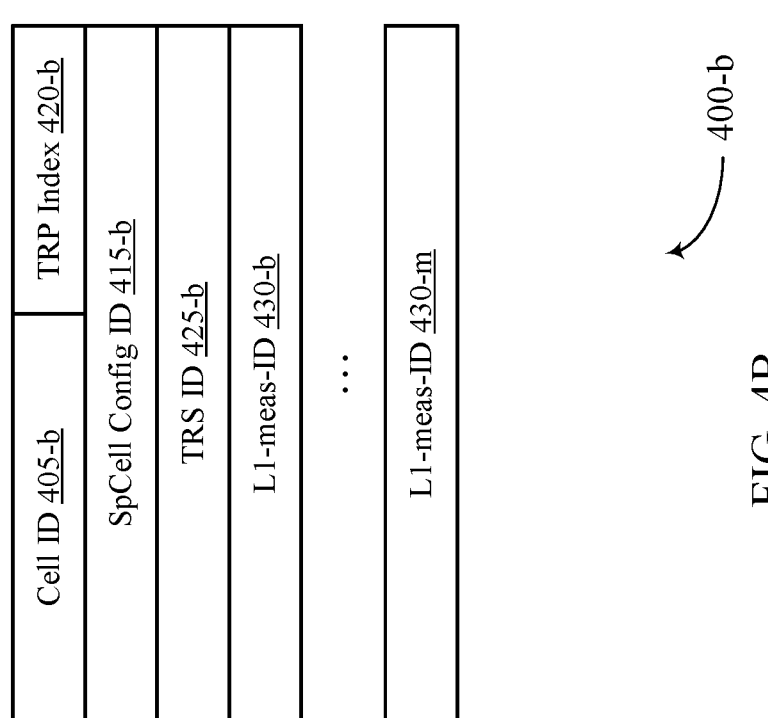
FIGS. 4A, 4B, and 5 illustrate examples of message formats that support control signaling for SpCell mobility in accordance with one or more aspects of the present disclosure.
Figure 4A:
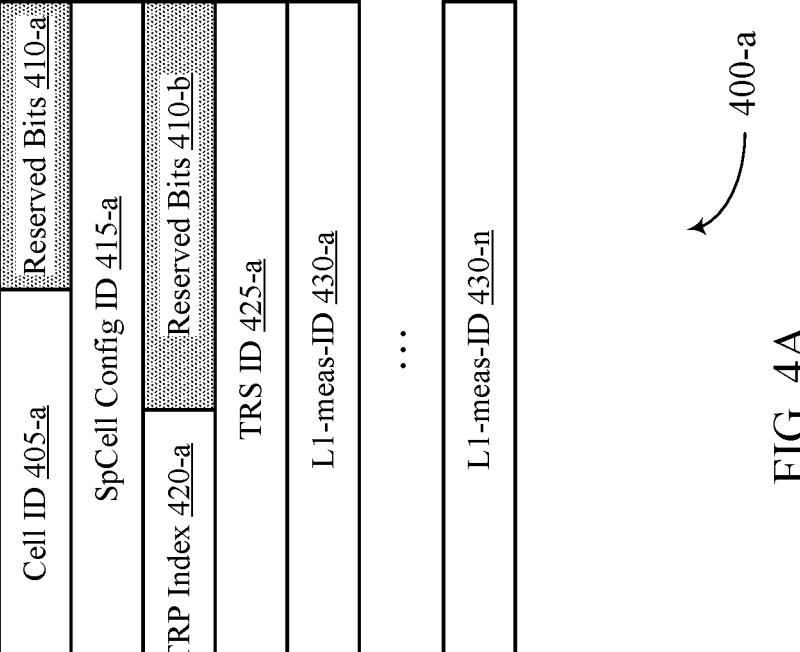

FIGS. 4A and 4B illustrate examples of message formats 400 that support control signaling for SpCell mobility in accordance with one or more aspects of the present disclosure. FIG. 4A illustrates an example of a message format 400-*a* including reserved bits for SpCell mobility. A network entity 105, such as a network entity 105 described with reference to FIGS. 1 through 3, may transmit a control signal according to the message format 400-*a*. The control signal—which may be an example of an SpCell mobility signal as described with reference to FIG. 3—may trigger a UE 115, such as a UE 115 described with reference to FIGS. 1 through 3, to switch to a new SpCell. The message format 400-*a* may be an example of a message format for a MAC-CE to trigger SpCell mobility (e.g., for L2 mobility). The MAC-CE may include a logical channel identifier (LCID) specific to L2 mobility. Alternatively, the message format 400-*a* may be an example of information included in one or more DCI messages to trigger SpCell mobility (e.g., for L1 mobility). The one or more DCI messages may have a DCI format specific to L1 mobility. The MAC-CE or DCI messages may trigger SpCell activation, pTRP activation, or both for a UE 115.

The message format 400-*a* may include a field indicating a cell ID 405-*a*. The cell ID 405-*a* may indicate the cell to set as the new SpCell. For example, the UE 115 receiving the control signal (e.g., MAC-CE or DCI) indicating the cell ID 405-*a* may switch from a current SpCell to the cell corresponding to the cell ID 405-*a*. In some cases, the UE 115 may have previously been configured with multiple cell IDs corresponding to nearby cells (e.g., in an L1/L2 mobility configured cell set), and the UE 115 may determine the new SpCell based on the previously configured cell IDs and the indicated cell ID 405-*a*.

In some examples, the message format 400-*a* may additionally include a field indicating an SpCell configuration ID 415-*a*. For example, in some cases, the new SpCell indicated by the cell ID 405-*a* may have multiple configurations available (e.g., according to a previous L1/L2 mobility configured cell set, for example, via RRC signaling). The SpCell configuration ID 415-*a* may be an example of a pointer to the specific SpCell configuration for the UE 115 to activate for the new SpCell. In some other examples, the message may fail to indicate an SpCell configuration ID 415-*a*, and the UE 115 may activate a default configuration for the new SpCell or may use a configuration previously configured by the network (e.g., in RRC signaling) for the cell indicated by the cell ID 405-*a*.

The message format 400-*a* may additionally include a field indicating a TRP index 420-*a* (e.g., a TRP ID) for the cell designated as the new SpCell. The TRP index 420-*a* may indicate the pTRP for communication for the SpCell, for example, if the cell has multiple TRPs. The network may communicate with the UE 115 via the pTRP of the new SpCell. In some cases, the network may apply the specific configuration indicated by the SpCell configuration ID 415-*a* for the pTRP.

In some examples, the message format 400-*a* may additionally include a field indicating a channel state information (CSI) reference signal (RS) for tracking (TRS) ID 425-*a*. The TRS ID 425-*a* may support beam refinement for communicating with the new SpCell. For example, if the cell indicated by the cell ID 405-*a* is currently deactivated (e.g., is part of the L1/L2 mobility deactivated cell set), the control signal may trigger activating of the cell and updating the cell as the new SpCell. To support activating the cell, the UE 115 receiving the control signal may perform beam refinement based on the TRS ID 425-*a*. For example, the TRS ID 425-*a* may indicate one or more transmission configuration indicator (TCI) states to activate for the new SpCell (e.g., for one or more TRPs of the new SpCell). For example, the TRS ID 425-*a* may include information for multiple TRPs of the new SpCell. Additionally, or alternatively, the TRS ID 425-*a* may indicate one or more reference signals (e.g., CSI-RSs) for the UE 115 to use for tracking and beam refinement. The UE 115 may monitor for the reference signals, measure reference signal power, and perform beamforming management and beam refinement based on the measured reference signal power. If the new SpCell is already active (e.g., the cell indicated by the cell ID 405-*a* is active for the UE 115 prior to the UE 115 receiving the control signal), the message format 400-*a* may not include the TRS ID 425-*a*. For example, the field indicating the TRS ID 425-*a* may be set to a default value or may not be included in the control signal. Because the cell is already active, the UE 115 may already store TRS ID information for the cell, may have already performed beam refinement for the cell, or both.

In some examples, the message format 400-*a* may include one or more fields indicating L1 measurement IDs for deactivated cells. For example, the network may indicate an L1 measurement ID for a deactivated cell so that the UE 115 receiving the control signal according to the message format 400-*a* may perform L1 measurements for the deactivated cell (e.g., to monitor signal quality, channel quality, or both for the deactivated cell). In some cases, the message format 400-*a* may include an L1 measurement ID for each deactivated cell, where the L1 measurement ID corresponds to multiple TRPs of the respective deactivated cell. For example, the single L1 measurement ID for multiple TRPs may indicate configuration for each of the cell's TRPs (e.g., separately based on the single L1 measurement ID) or may indicate a common configuration to be applied to each of the cell's TRPs. The L1 measurement IDs may be organized in ascending order of deactivated cell IDs. In some other cases, the message format 400-*a* may include an L1 measurement ID for each TRP of a deactivated cell. The L1 measurement ID may indicate a configuration for the respective TRP of the deactivated cell. The L1 measurement IDs may be organized in ascending order of deactivated cell IDs and ascending order of TRP IDs for a given cell ID. The message format 400-*a* may include any quantity of L1 measurement IDs, for example, based on the quantity of cells, TRPs, or both to deactivate in response to the control signal. As illustrated, the message format 400-*a* may include a first L1 measurement ID 430-*a* through a last L1 measurement ID 430-*n*.

In some examples, the message format 400-*a* may include reserved bits, which may be used to indicate one or more parameters associated with the SpCell activation, SpCell deactivation, TRP activation, TRP deactivation, beam management, or any combination thereof. In some cases, the message format 400-*a* may include a first set of reserved bits 410-*a*, which may be referred to as R1 bits. Additionally, or alternatively, the message format 400-*a* may include a second set of reserved bits 410-*b*, which may be referred to as R2 bits. At least a portion of the reserved bits (e.g., the reserved bits 410-*a*, the reserved bits 410-*b*, or a combination thereof) may indicate which fields are present in the control signal (e.g., according to the message format 400-*a*). For example, the reserved bits may indicate if an SpCell configuration ID 415-*a* is included in the control signal. Additionally, or alternatively, the reserved bits may indicate if L1 measurement ID fields for deactivated cells or TRPs are included in the control signal. In some cases, the reserved bits may indicate a quantity of L1 measurement IDs included in the control signal. Additionally, or alternatively, the reserved bits may indicate if a TRS ID 425-*a* is included in the control signal.

In some cases, at least a portion of the reserved bits (e.g., the reserved bits 410-*a*, the reserved bits 410-*b*, or a combination thereof) may indicate a status for the previous SpCell (e.g., the current SpCell for the UE 115 when the UE 115 receives the control signal). The status may indicate whether the previous SpCell is to remain active or be deactivated based on the SpCell update to the new SpCell indicated by the cell ID 405-*a*. For example, the reserved bits may include a bit that may function as a flag for the status of the previous SpCell. If the bit is set to a first value (e.g., 0), the UE 115 may deactivate the previous SpCell based on switching to the new SpCell. If the bit is set to a second value (e.g., 1), the UE 115 may maintain the previous SpCell as an active cell despite switching to the new SpCell.

The UE 115 receiving the control signal formatted according to the message format 400-*a* may determine that the control signal is specific to L1/L2 mobility (e.g., based on an LCID for a MAC-CE or based on a DCI format for a DCI message). The UE 115 may decode and interpret the information carried within the control signal based on determining that the control signal is specific to L1/L2 mobility. The UE 115 may trigger an SpCell update in response to receiving the control signal indicating the cell ID 405-*a* and may activate a pTRP based on the TRP index 420-*a*.

FIG. 4B illustrates an example of a message format 400-*b* without reserved bits for SpCell mobility. A network entity 105, such as a network entity 105 described with reference to FIGS. 1 through 4A, may transmit a control signal according to the message format 400-*b*. The control signal— which may be an example of an SpCell mobility signal as described with reference to FIG. 3—may trigger a UE 115, such as a UE 115 described with reference to FIGS. 1 through 4A, to switch to a new SpCell. The message format 400-*b* may be an example of a message format for a MAC-CE to trigger SpCell mobility (e.g., for L2 mobility) or one or more DCI messages to trigger SpCell mobility (e.g., for L1 mobility). The MAC-CE or DCI messages may trigger SpCell activation, pTRP activation, or both for a UE 115.

The message format 400-*b* may fail to include reserved bits for indicating additional information relating to SpCell activation, SpCell deactivation, TRP activation, TRP deactivation, beam management, or any combination thereof. For example, the network may reduce the signaling overhead associated with the control signal for L1/L2 mobility by refraining from including reserved bits in the control signal. Instead, the message format 400-*b* may include a cell ID 405-*b*, a TRP index 420-*b*, an SpCell configuration ID 415-*b*, a TRS ID 425-*b*, one or more L1 measurement IDs (e.g., a first L1 measurement ID 430-*b* through a last L1 measurement ID 430-*m*), or any combination of these, as described herein with reference to FIG. 4A.

Figure 5:
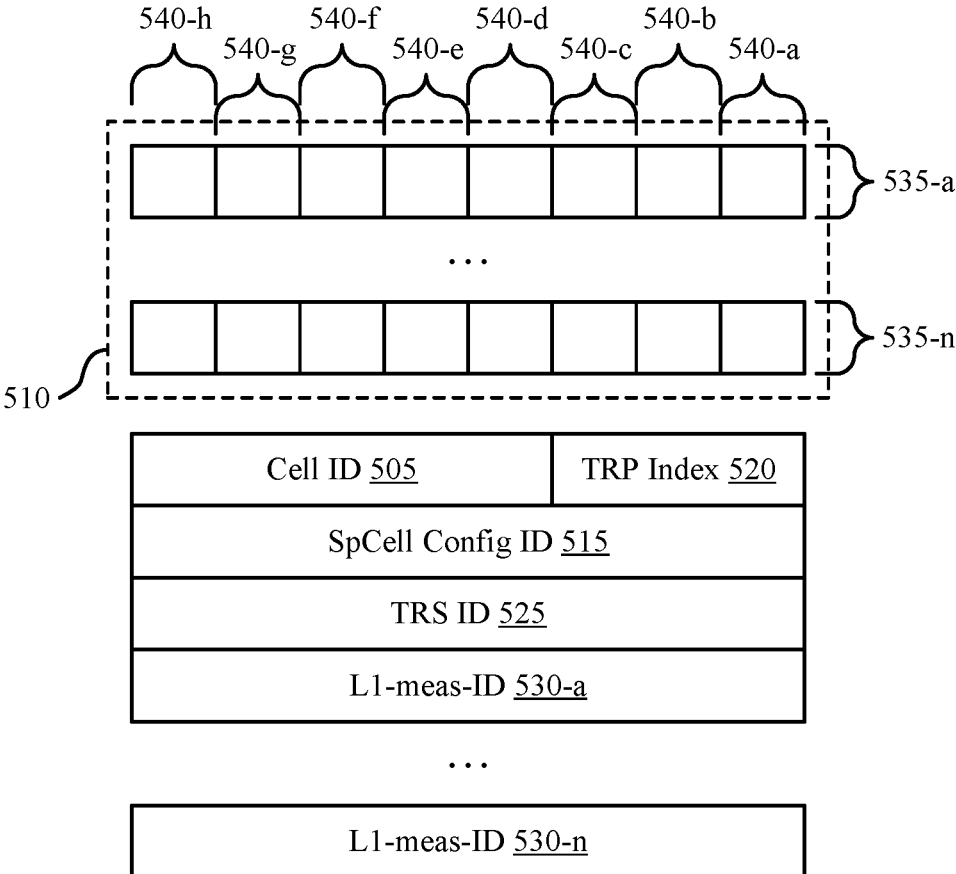

FIG. 5 illustrates an example of a message format 500 that supports control signaling for SpCell mobility in accordance with one or more aspects of the present disclosure. A network entity 105, such as a network entity 105 described with reference to FIGS. 1 through 4B, may transmit a control signal according to the message format 500. The control signal—which may be an example of an SpCell mobility signal as described with reference to FIG. 3—may trigger a UE 115, such as a UE 115 described with reference to FIGS. 1 through 4B, to switch to a new SpCell. The message format 500 may be an example of a message format for a MAC-CE to trigger SpCell mobility (e.g., for L2 mobility) or one or more DCI messages to trigger SpCell mobility (e.g., for L1 mobility). The MAC-CE or DCI messages may trigger SpCell activation, pTRP activation, or both for a UE

115. The message format 500 may include a bit map 510 to indicate specific TRP activation, deactivation, or some combination thereof.

The message format 500 may include a cell ID 505, a TRP index 520, an SpCell configuration ID 515, a TRS ID 525, one or more L1 measurement IDs (e.g., a first L1 measurement ID 530-*a* through a last L1 measurement ID 530-*n*), or any combination of these, as described herein with reference to FIG. 4A. Additionally, or alternatively, the message format 500 may include one or more reserved bits, as described herein with reference to FIG. 4A. In some examples, a reserved bit in the message format 500 may indicate whether a bit map 510 is included in the control signal. If a bit map 510 is not included, a UE 115 receiving the control signal may determine that TRP-specific activation for active cells is not supported by the control signal, and may activate any TRPs associated with the activated cells.

The message format 500 may additionally include a bit map 510. In some examples, the bit map may be organized into octets (e.g., sets of eight bits). For example, each octet may include a first bit 540-*a*, a second bit 540-*b*, a third bit 540-*c*, a fourth bit 540-*d*, a fifth bit 540-*e*, a sixth bit 540-*f*, a seventh bit 540-*g*, and an eight bit 540-*h*. In some cases, some bits of the bit map 510 may be unused (e.g., set to default values, reserved). The bit map 510 may include a quantity of octets from a first octet 535-*a* to a last octet 535-*n*.

The network may generate the bit map 510 to indicate one or more TRPs associated with configured cells (e.g., in an L1/L2 mobility configured cell set) for a UE 115 receiving the control signal to activate, indicate one or more TRPs associated with configured cells for the UE 115 to deactivate, or both. The network may add the bit map 510 into the control signal updating the SpCell to indicate TRP-specific activation information, deactivation information, or both. In some examples, the bit map 510 may indicate the activation of TRPs, deactivation of TRPs, or both for activated cells (e.g., in an L1/L2 mobility activated cell set), where the UE 115 may assume that TRPs associated with deactivated cells (e.g., in an L1/L2 mobility deactivated cell set) are deactivated. In this way, the control signal (e.g., a MAC-CE, a DCI signal) including the bit map 510 may support TRP-specific activation/deactivation.

In some examples, bits in the bit map 510 may be annotated as $T_{ik}$, where i refers to the row (e.g., octet) in the bit map 510 and k refers to the column in the bit map 510. The bit $T_{ik}$ in the bit map 510 may indicate TRP-specific activation information for the TRP of the ith cell ID and the kth TRP index. For example, if the bit $T_{ik}$ is set to a first bit value (e.g., 1), the UE 115 may activate the corresponding TRP; if the bit $T_{ik}$ is set to a second bit value (e.g., 0), the UE 115 may deactivate the corresponding TRP. In some examples, the TRP information may be included in the bit map 510 organized in ascending order of cell IDs and ascending order of TRP IDs. In some cases, the quantity of fields for TRPs may be fixed in the bit map 510 based on a threshold quantity (e.g., maximum quantity) of TRPs that can be configured or based on an actual quantity of configured TRPs per cell. For example, if a cell is associated with two TRPs, the bit map 510 may use a first bit 540-*a* and a second bit 540-*b* to indicate TRP-specific activation information for the two TRPs. The remaining bits in the octet may be reserved for other uses or, in some cases, may be used to indicate activation information for TRPs of other cells.

If the control signal activates the new SpCell (e.g., the cell ID 505 indicates a cell that was deactivated for the UE 115 prior to reception of the control signal), the UE 115 may activate the indicated cell and update the indicated cell to be the SpCell. Additionally, the control signal may indicate the TRS ID 525 for the activated cell and may include the bit map 510 to indicate TRP activation, TRP deactivation, or both for the activated cell. For example, based on the bit map 510, the UE 115 may activate a first TRP (e.g., the pTRP indicated by the TRP index 520) for the new SpCell but may maintain a second TRP for the new SpCell as deactivated. For example, a first bit in the bit map 510 corresponding to the first TRP of the new SpCell may indicate a first value for activation, while a second bit in the bit map 510 corresponding to the second TRP of the new SpCell may indicate a second value for deactivation. If the TRS ID 525 is not included in the control signal for the newly activated cell, the UE 115 may apply a default TRS ID for the cell. Similarly, if the bit map 510 is not included in the control signal for the newly activated cell, the UE 115 may activate each TRP associated with the cell.

Figure 6:
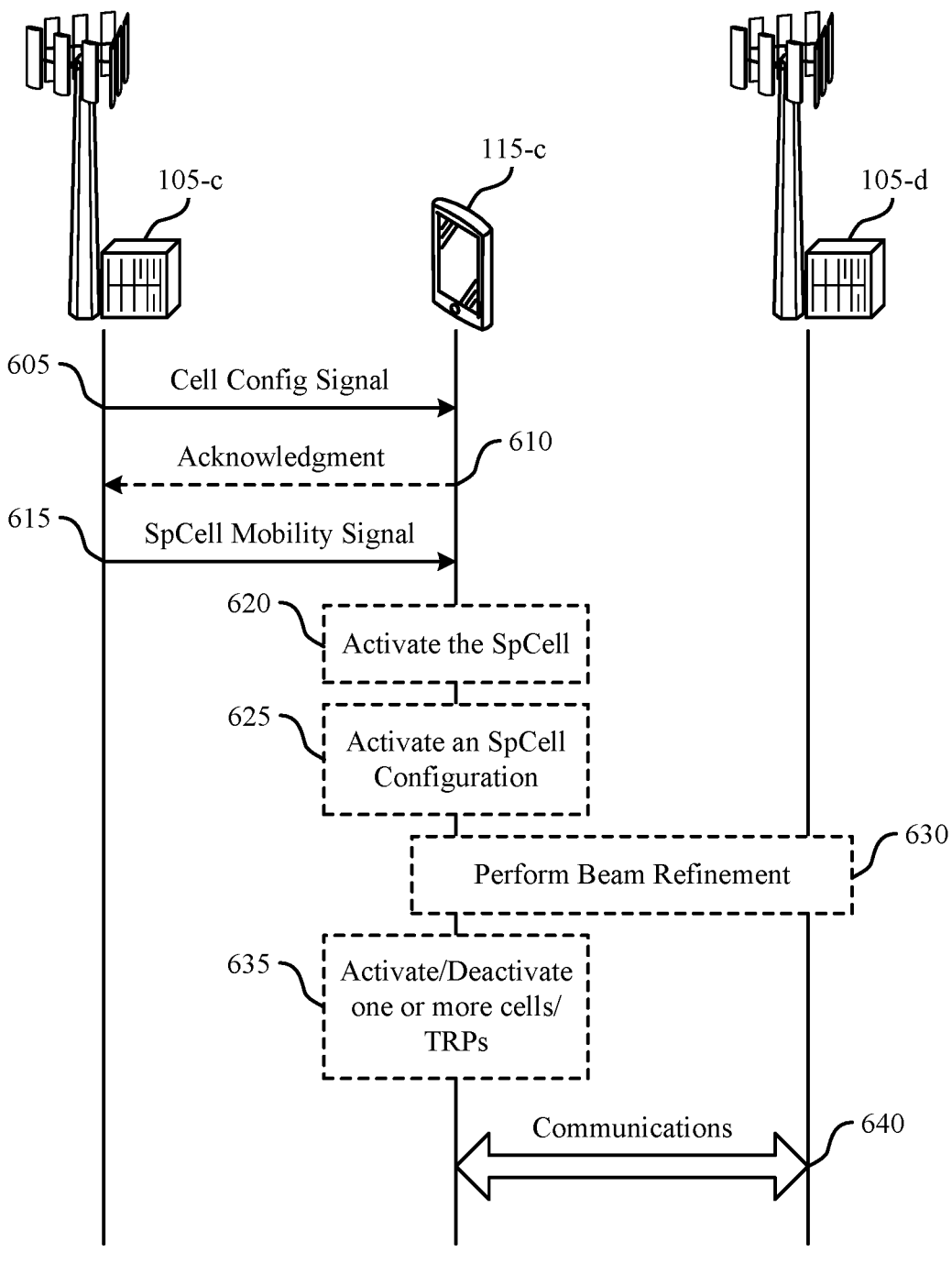
FIG. 6 illustrates an example of a process flow that supports control signaling for SpCell mobility in accordance with one or more aspects of the present disclosure.

FIG. 6 illustrates an example of a process flow 600 that supports control signaling for SpCell mobility in accordance with one or more aspects of the present disclosure. The process flow 600 may implement or be implemented by aspects of a wireless communications system 100, a network architecture 200, a wireless communications system 300, or some combination thereof as described herein with reference to FIGS. 1 through 3. The process flow 600 may include a UE 115-c, a network entity 105-c, and a network entity 105-d, which may be examples of a UE 115 and network entities 105 as described herein with reference to FIGS. 1 through 5. For example, the network entity 105-c may trigger an SpCell update at the UE 115-c using L1/L2 signaling according to a message format, such as a message format 400-a, a message format 400-b, or a message format 500 as described herein with reference to FIGS. 4A through 5. In the following description of the process flow 600, the operations performed by the devices may be performed in different orders or at different times. Additionally, or alternatively, some operations may be omitted from the process flow 600, and other operations may be added to the process flow 600.

At 605, the network entity 105-c may transmit, to the UE 115-c, a cell configuration signal. For example, the network entity 105-c may transmit a first control signal configuring a set of multiple cells supporting mobility for the UE 115-c. The first control signal may additionally set a first cell of the configured cells as the SpCell for the UE 115-c. The first control signal may be an example of an RRC signal and may activate one or more cells, deactivate one or more cells, or both. The UE 115-c may receive the first control signal indicating the configuration of the cells supporting mobility for the UE 115-c. The UE 115-c may communicate with the network via the first cell set as the SpCell. The cells may be configured to support L1/L2 mobility for the UE 115-c.

In some examples, at 610, the UE 115-c may transmit an acknowledgment message in response to the cell configuration signal. For example, the UE 115-c may transmit a positive acknowledgment to the network entity 105-c indicating that the UE 115-c received the cell configuration signal and reconfigured cell information based on the cell configuration signal. In some cases, the acknowledgment message may be an example of an RRC reconfiguration complete message.

At 615, the network entity 105-c may transmit, to the UE 115-c, an SpCell mobility signal (e.g., in L1 signaling, L2 signaling, or both). For example, the network entity 105-c may transmit a second control signal indicating for the UE 115-c to update the SpCell for communication to a second cell of the set of multiple configured cells. The UE 115-c may receive the second control signal indicating to update the SpCell for communication to the second cell and may set the second cell as the new SpCell. For example, the UE 115-c may switch from using the first cell as the SpCell to using the second cell as the SpCell in response to receiving the second control signal. In some examples, the second control signal may be an example of a MAC-CE. The MAC-CE may include an LCID indicating that the MAC-CE configures the UE 115-c to update the SpCell (e.g., switch the SpCell from the first cell to the second cell). In some other examples, the second control signal may be an example of a DCI signal. The DCI signal may have a DCI format indicating that the DCI signal configures the UE 115-c to update the SpCell (e.g., switch the SpCell from the first cell to the second cell).

In some cases, the second control signal may additionally indicate a pTRP for activation for the second cell (e.g., the new SpCell). For example, if the second cell is associated with multiple TRPs, the second control signal may indicate a TRP index corresponding to the TRP of the multiple TRPs to set as the pTRP for the SpCell. The UE 115-c may communicate with the pTRP based on this indication. In some cases, the first control signal may initially configure a first pTRP for the second cell, and the second control signal may update the configuration to a different pTRP for the second cell.

In some examples, the second cell may currently be deactivated (e.g., based on the cell configuration signal received at 605). At 620, the UE 115-c may activate the second cell for communication as the SpCell in response to receiving the second control signal. In some cases, activating the second cell may involve activating multiple TRPs associated with the second cell (e.g., the pTRP and any aTRPs associated with the cell). In some such examples, the second control signal may further indicate an ID of a TRS based on the second cell being deactivated. The TRS ID may support beam management operations at the UE 115-c for the newly activated SpCell.

In some examples, the second control signal may further indicate a configuration for the SpCell. At 625, the UE 115-c may activate the configuration for the SpCell based on the second control signal. In some cases, the SpCell configuration may be activated from a set of multiple configurations available for the second cell according to the cell configuration (e.g., based on the cell configuration signal).

In some examples, at 630, the UE 115-c may perform beam refinement for the second cell based on a TRS ID indicated in the second control signal. For example, the UE 115-c may receive CSI-RSs from the second cell (e.g., corresponding to the network entity 105-d) and may use the CSI-RSs to perform beamforming operations. In some cases, the TRS ID may correspond to multiple TRPs for the second cell. Additionally, or alternatively, the TRS ID may indicate one or more TCI states to activate for the second cell, one or more reference signals (e.g., the CSI-RSs) for beam refinement for the second cell, or both.

In some examples, at 635, the UE 115-c may activate one or more additional cells, deactivate one or more additional cells, activate one or more TRPs, deactivate one or more TRPs, or any combination thereof based on the second control signal. In some cases, the second control signal may indicate one or more cells to deactivate, and the UE 115-c may deactivate the one or more cells. Additionally, or alternatively, the second control signal may indicate one or more L1 measurement IDs and reporting configurations corresponding to one or more deactivated cells (e.g., cells previously deactivated or cells indicated to deactivate in the second control signal), corresponding to one or more TRPs associated with the one or more deactivated cells, or some combination thereof. The UE 115-*c* may assume that the TRPs associated with a deactivated cell are also deactivated, such that deactivating a cell may involve deactivating the TRPs associated with the cell.

In some cases, the second control signal may include a bit map for TRP activation. The UE 115-*c* may activate one or more TRPs associated with configured cells based on the bit map. Additionally, or alternatively, the UE 115-*c* may deactivate one or more other TRPs associated with the configured cells based on the bit map. That is, the bit map may support TRP-specific activation and deactivation at the UE 115-*c* via L1/L2 signaling.

In some cases, the second control signal may include a set of reserved bits indicating which fields are present within the second control signal (e.g., an SpCell configuration ID field, a TRP index field, a TRS ID field, one or more L1 measurement ID fields). Additionally, or alternatively, the set of reserved bits may indicate to deactivate the first cell configured as the SpCell for communication or maintain the first cell in an active state, for example, following updating the SpCell to the second cell.

At 640, the UE 115-*c* may communicate with the network via the new SpCell. For example, the UE 115-*c* may communicate with the second cell via the pTRP based on the second control signal. In some examples, the UE 115-*c* may communicate with a second network entity 105-*d* corresponding to the second cell following the SpCell update.

Figure 7:
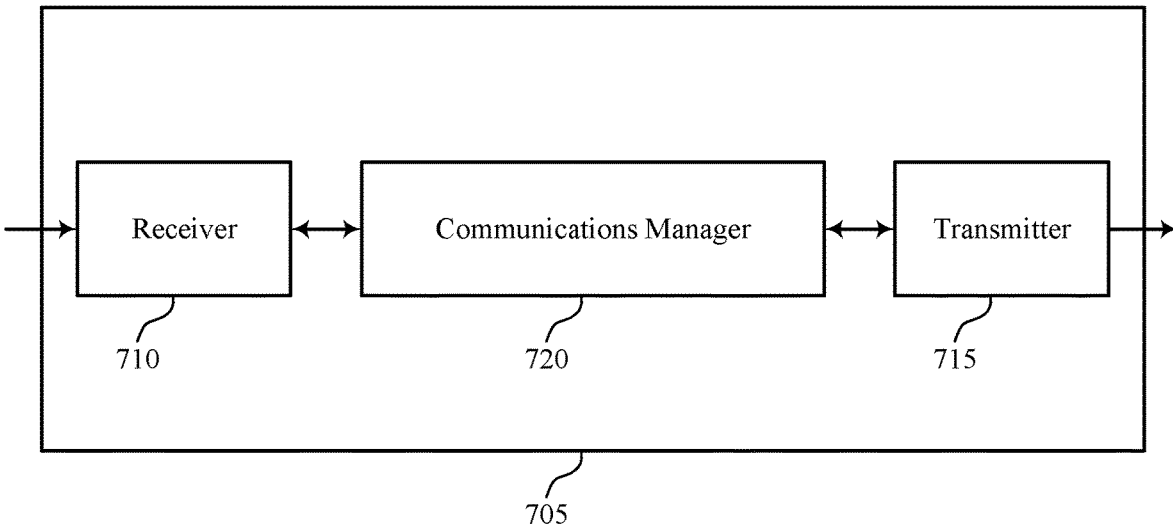
FIGS. 7 and 8 show block diagrams of devices that support control signaling for SpCell mobility in accordance with one or more aspects of the present disclosure.

FIG. 7 shows a block diagram 700 of a device 705 that supports control signaling for SpCell mobility in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to control signaling for SpCell mobility). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to control signaling for SpCell mobility). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of control signaling for SpCell mobility as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving a first control signal indicating a configuration of a set of multiple cells supporting mobility for the UE. A first cell of the set of multiple cells is an SpCell for communication. The communications manager 720 may be configured as or otherwise support a means for receiving a second control signal indicating to update the SpCell for communication from the first cell to a second cell of the set of multiple cells and indicating a pTRP for activation for the second cell. The communications manager 720 may be configured as or otherwise support a means for communicating with the second cell via the pTRP based on the second control signal.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for improved SpCell updating. For example, the device 705 may update an SpCell based on L1 or L2 signaling, which may support relatively lower latency SpCell updates than L3 signaling. Additionally, or alternatively, updating an SpCell in response to a MAC-CE or DCI signal may reduce the signaling overhead involved in the SpCell update, for example, as compared to a handover procedure for SpCell reconfiguration (e.g., using RRC signaling). Reducing the signaling overhead may reduce a processing overhead at the device 705, effectively reducing a quantity of processing resources spun up to handle an SpCell update.

Figure 8:

FIG. 8 shows a block diagram 800 of a device 805 that supports control signaling for SpCell mobility in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to control signaling for SpCell mobility). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to control signaling for SpCell mobility). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of control signaling for SpCell mobility as described herein. For example, the communications manager 820 may include a cell configuration component 825, an SpCell mobility component 830, a communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The cell configuration component 825 may be configured as or otherwise support a means for receiving a first control signal indicating a configuration of a set of multiple cells supporting mobility for the UE. A first cell of the set of multiple cells may be an SpCell for communication. The SpCell mobility component 830 may be configured as or otherwise support a means for receiving a second control signal indicating to update the SpCell for communication from the first cell to a second cell of the set of multiple cells and indicating a pTRP for activation for the second cell. The communication component 835 may be configured as or otherwise support a means for communicating with the second cell via the pTRP based on the second control signal.

Figure 9:
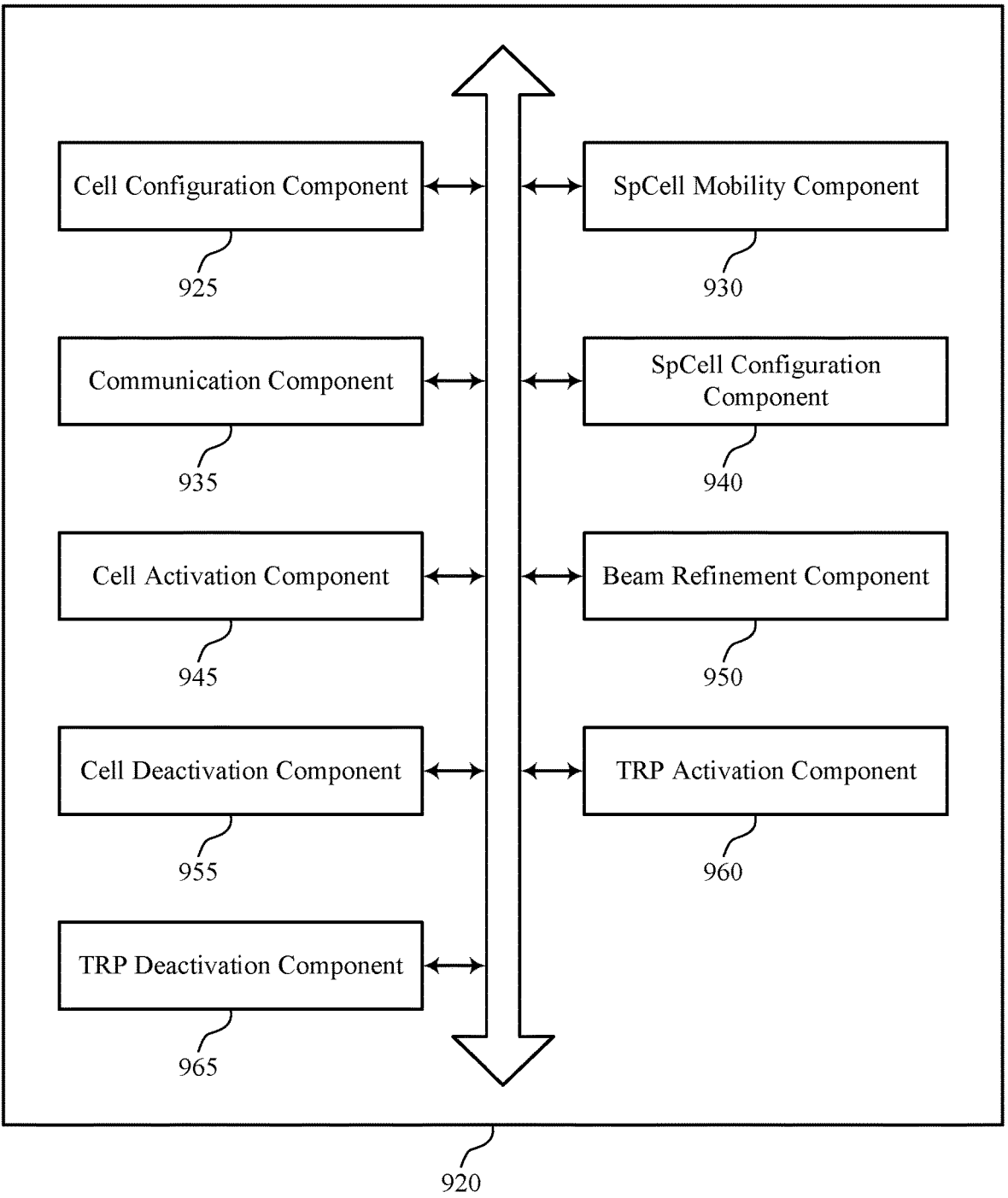
FIG. 9 shows a block diagram of a communications manager that supports control signaling for SpCell mobility in accordance with one or more aspects of the present disclosure.

FIG. 9 shows a block diagram 900 of a communications manager 920 that supports control signaling for SpCell mobility in accordance with one or more aspects of the present disclosure. The communications manager 920 may be an example of aspects of a communications manager 720, a communications manager 820, or both, as described herein. The communications manager 920, or various components thereof, may be an example of means for performing various aspects of control signaling for SpCell mobility as described herein. For example, the communications manager 920 may include a cell configuration component 925, an SpCell mobility component 930, a communication component 935, an SpCell configuration component 940, a cell activation component 945, a beam refinement component 950, a cell deactivation component 955, a TRP activation component 960, a TRP deactivation component 965, or any combination thereof. Each of these components may communicate, directly or indirectly, with one another (e.g., via one or more buses).

The communications manager 920 may support wireless communications at a UE in accordance with examples as disclosed herein. The cell configuration component 925 may be configured as or otherwise support a means for receiving a first control signal indicating a configuration of a set of multiple cells supporting mobility for the UE. A first cell of the set of multiple cells may be an SpCell for communication. The SpCell mobility component 930 may be configured as or otherwise support a means for receiving a second control signal indicating to update the SpCell for communication from the first cell to a second cell of the set of multiple cells and indicating a pTRP for activation for the second cell. The communication component 935 may be configured as or otherwise support a means for communicating with the second cell via the pTRP based on the second control signal.

In some examples, the second control signal further indicates a configuration for the SpCell, and the SpCell configuration component 940 may be configured as or otherwise support a means for activating the configuration for the SpCell from a set of multiple configurations available for the second cell based on the second control signal, where the communicating is further based on the activated configuration for the SpCell.

In some examples, the second cell is deactivated based on the first control signal and the second control signal further indicates an identifier of a TRS based on the second cell being deactivated. In some examples, the cell activation component 945 may be configured as or otherwise support a means for activating the second cell in response to receiving the second control signal. In some examples, the beam refinement component 950 may be configured as or otherwise support a means for performing beam refinement for the second cell based on the identifier of the TRS.

In some examples, the identifier of the TRS corresponds to a set of multiple TRPs for the second cell. In some examples, the identifier of the TRS indicates one or more TCI states to activate for the second cell, one or more reference signals for beam refinement for the second cell, or both.

In some examples, the cell deactivation component 955 may be configured as or otherwise support a means for deactivating one or more cells based on the second control signal further indicating the one or more cells to deactivate. In some examples, the second control signal indicates one or more L1 measurement identifiers and reporting configurations corresponding to the one or more cells to deactivate, one or more TRPs associated with the one or more cells to deactivate, or a combination thereof.

In some examples, to support deactivating the one or more cells, the TRP deactivation component 965 may be configured as or otherwise support a means for deactivating a set of multiple TRPs associated with the one or more cells.

In some examples, the TRP activation component 960 may be configured as or otherwise support a means for activating one or more additional TRPs associated with the second cell based on the second control signal indicating to update the SpCell for communication with the second cell.

In some examples, the TRP activation component 960 may be configured as or otherwise support a means for activating one or more TRPs associated with the set of multiple cells based on the second control signal including a bit map for TRP activation.

In some examples, the TRP deactivation component 965 may be configured as or otherwise support a means for deactivating one or more other TRPs associated with the set of multiple cells based on the bit map for TRP activation.

In some examples, the second control signal includes an LCID indicating that the second control signal configures the UE to switch the SpCell from the first cell to the second cell. In some other examples, the second control signal corresponds to a DCI format indicating that the second control signal configures the UE to switch the SpCell from the first cell to the second cell.

In some examples, the second control signal further includes a set of reserved bits indicating which fields are present within the second control signal, indicating to deactivate the first cell configured as the SpCell for communication, indicating to maintain the first cell configured as the SpCell for communication as active, or a combination thereof.

In some examples, the first control signal configures a first pTRP for the second cell from a set of multiple TRPs associated with the second cell. In some examples, the pTRP for activation for the second cell indicated using the second control signal includes a second pTRP from the set of multiple TRPs different from the first pTRP.

In some examples, the first control signal includes an RRC signal. In some examples, the second control signal includes a MAC-CE, a DCI signal, or both.

Figure 10:
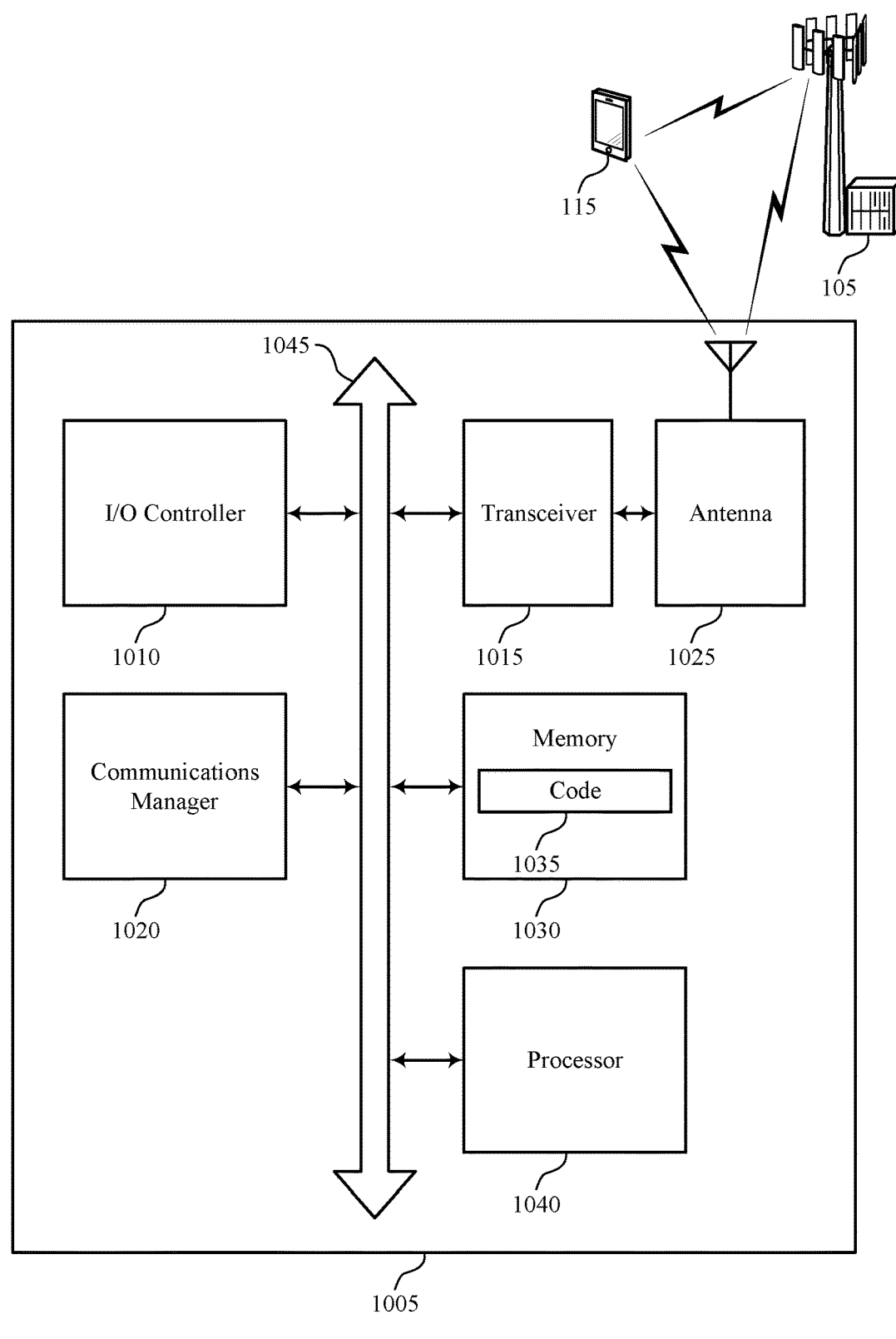
FIG. 10 shows a diagram of a system including a device that supports control signaling for SpCell mobility in accordance with one or more aspects of the present disclosure.

FIG. 10 shows a diagram of a system 1000 including a device 1005 that supports control signaling for SpCell mobility in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting control signaling for SpCell mobility). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a first control signal indicating a configuration of a set of multiple cells supporting mobility for the UE. A first cell of the set of multiple cells may be configured as an SpCell for communication. The communications manager 1020 may be configured as or otherwise support a means for receiving a second control signal indicating to update the SpCell for communication from the first cell to a second cell of the set of multiple cells and indicating a pTRP for activation for the second cell. The communications manager 1020 may be configured as or otherwise support a means for communicating with the second cell via the pTRP based on the second control signal.

By including or configuring the communications manager 1020 in accordance with examples as described herein, the device 1005 may support techniques for reducing SpCell updating latency and signaling overhead to support improved SpCell mobility techniques. For example, the device 1005 may update an SpCell to a new SpCell in response to L1 or L2 signaling, which may support relatively lower latency than L3 signaling. Additionally, or alternatively, the device 1005 may support TRP activation, TRP deactivation, cell activation, cell deactivation, or some combination thereof using L1 or L2 signaling, as opposed to cell reconfiguration using L3 signaling (e.g., RRC signaling). Accordingly, the device 1005 may support SpCell connection and other cell management using relatively low latency and relatively low overhead L1 signals (e.g., DCI), L2 signals (e.g., MAC-CEs), or both.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of control signaling for SpCell mobility as described herein, or the processor 1040 and the memory 1030 may be otherwise configured to perform or support such operations.

Figure 11:
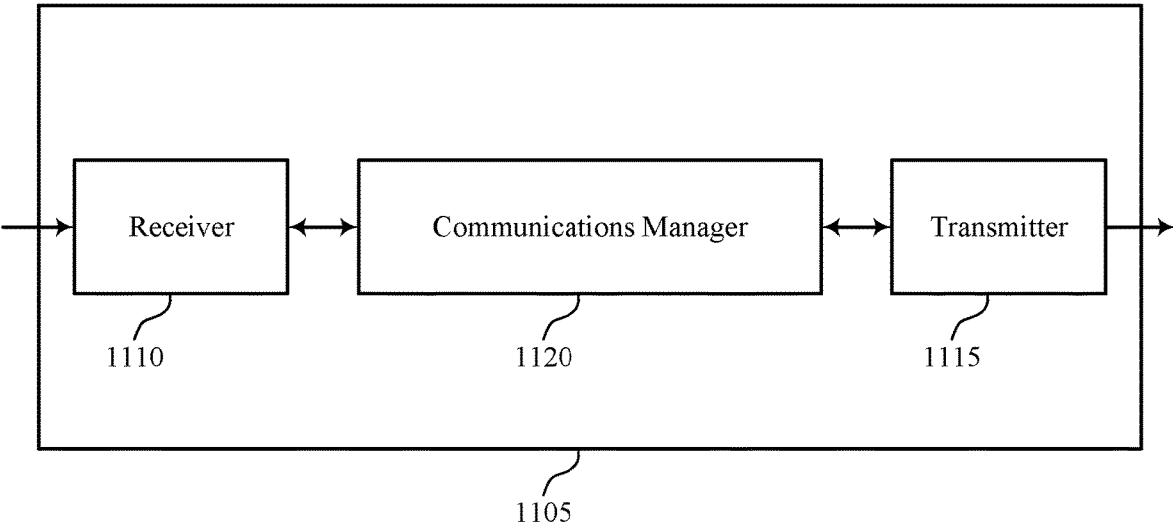
FIGS. 11 and 12 show block diagrams of devices that support control signaling for SpCell mobility in accordance with one or more aspects of the present disclosure.

FIG. 11 shows a block diagram 1100 of a device 1105 that supports control signaling for SpCell mobility in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of control signaling for SpCell mobility as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at one or more network entities in accordance with examples as disclosed herein. For example, the communications manager 1120 may be configured as or otherwise support a means for transmitting a first control signal configuring a set of multiple cells supporting mobility for a UE. A first cell of the set of multiple cells may be an SpCell for communication for the UE. The communications manager 1120 may be configured as or otherwise support a means for transmitting a second control signal indicating for the UE to update the SpCell for communication from the first cell to a second cell of the set of multiple cells and indicating a pTRP for activation for the second cell. The communications manager 1120 may be configured as or otherwise support a means for communicating via the pTRP for the second cell based on the second control signal.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reducing power overhead involved with SpCell updates, for example, by reducing the signaling overhead for trigger a UE 115 to update an SpCell.

Figure 12:
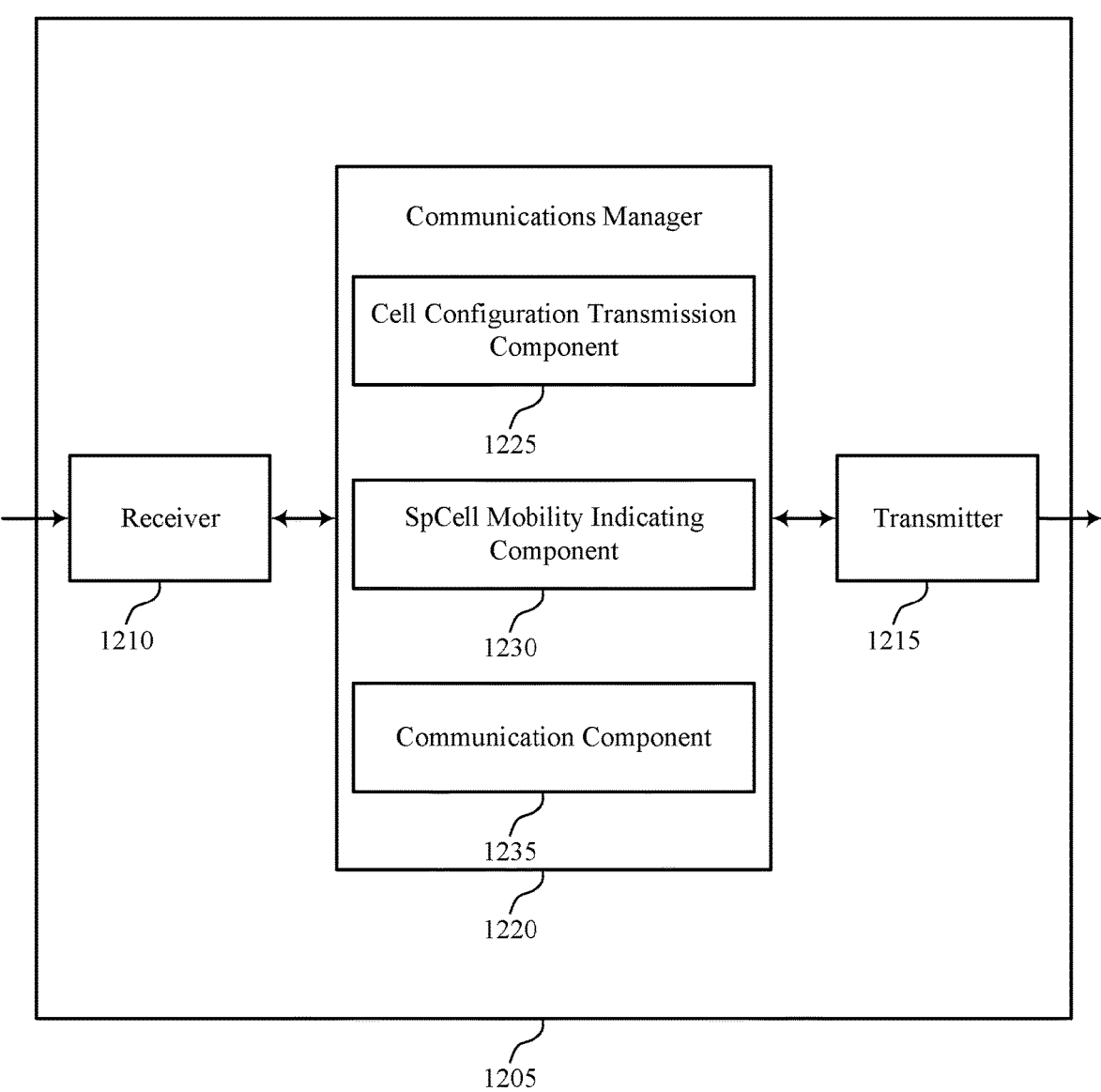

FIG. 12 shows a block diagram 1200 of a device 1205 that supports control signaling for SpCell mobility in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of control signaling for special cell mobility as described herein. For example, the communications manager 1220 may include a cell configuration transmission component 1225, an SpCell mobility indicating component 1230, a communication component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The cell configuration transmission component 1225 may be configured as or otherwise support a means for transmitting a first control signal configuring a set of multiple cells supporting mobility for a UE. A first cell of the set of multiple cells may be an SpCell for communication for the UE. The SpCell mobility indicating component 1230 may be configured as or otherwise support a means for transmitting a second control signal indicating for the UE to update the SpCell for communication from the first cell to a second cell of the set of multiple cells and indicating a pTRP for activation for the second cell. The communication component 1235 may be configured as or otherwise support a means for communicating via the pTRP for the second cell based on the second control signal.

Figure 13:
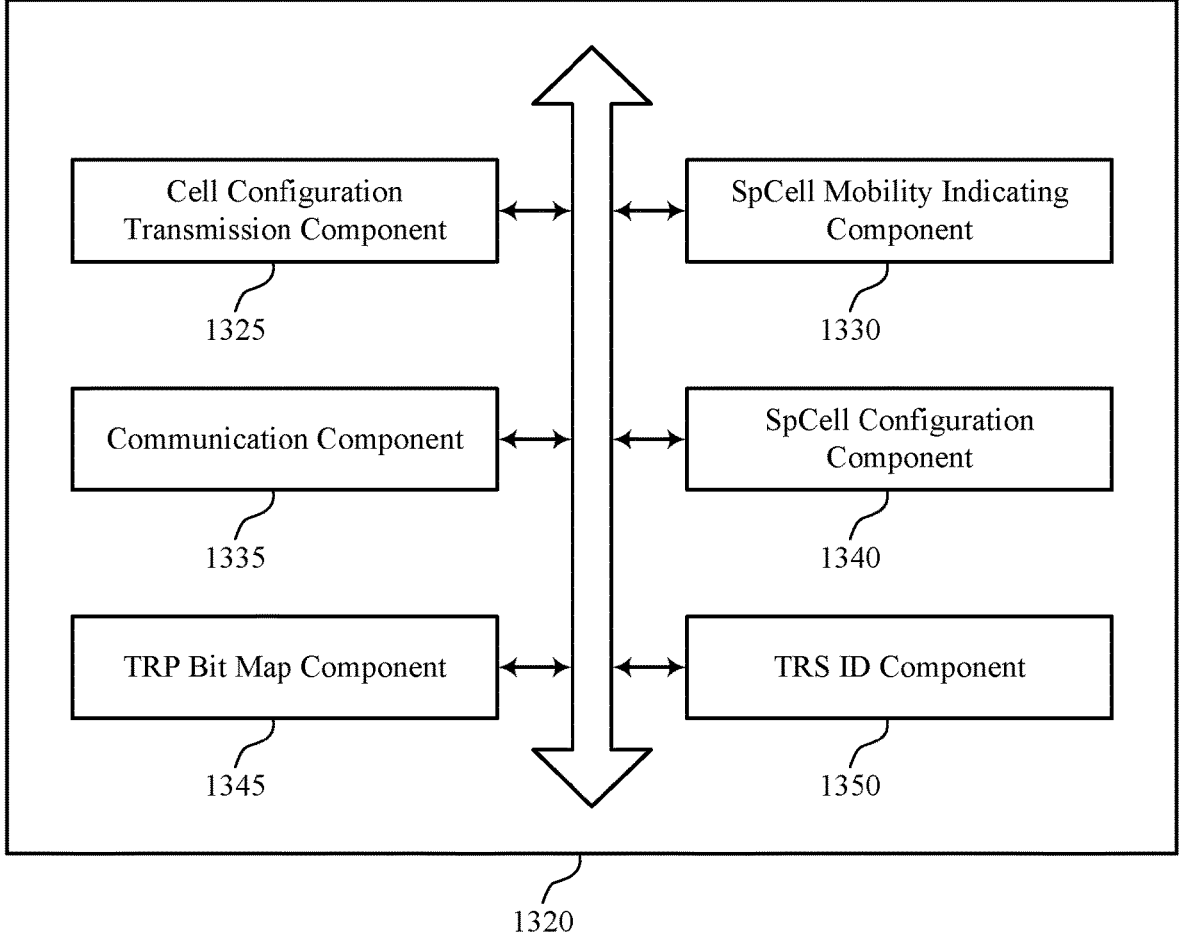
FIG. 13 shows a block diagram of a communications manager that supports control signaling for SpCell mobility in accordance with one or more aspects of the present disclosure.

FIG. 13 shows a block diagram 1300 of a communications manager 1320 that supports control signaling for SpCell mobility in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of control signaling for SpCell mobility as described herein. For example, the communications manager 1320 may include a cell configuration transmission component 1325, an SpCell mobility indicating component 1330, a communication component 1335, an SpCell configuration component 1340, a TRP bit map component 1345, a TRS ID component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The cell configuration transmission component 1325 may be configured as or otherwise support a means for transmitting a first control signal configuring a set of multiple cells supporting mobility for a UE. A first cell of the set of multiple cells may be an SpCell for communication for the UE. The SpCell mobility indicating component 1330 may be configured as or otherwise support a means for transmitting a second control signal indicating for the UE to update the SpCell for communication from the first cell to a second cell of the set of multiple cells and indicating a pTRP for activation for the second cell. The communication component 1335 may be configured as or otherwise support a means for communicating via the pTRP for the second cell based on the second control signal.

In some examples, the second control signal further indicates a configuration for the SpCell, and the SpCell configuration component 1340 may be configured as or otherwise support a means for activating the configuration for the SpCell from a set of multiple configurations available for the second cell based on the second control signal, where the communicating is further based on the activated configuration for the SpCell.

In some examples, the TRP bit map component 1345 may be configured as or otherwise support a means for generating a bit map for TRP activation indicating one or more TRPs associated with the set of multiple cells for the UE to activate, where the second control signal further includes the bit map. In some examples, the bit map further indicates one or more other TRPs associated with the set of multiple cells for the UE to deactivate.

In some examples, the second cell is deactivated for the UE based on the first control signal. In some examples, the second control signal further indicates an identifier of a TRS based on the second cell being deactivated for the UE, for example, using a TRS ID component 1350.

In some examples, the identifier of the TRS corresponds to a set of multiple TRPs for the second cell. In some examples, the identifier of the TRS indicates one or more TCI states to activate for the second cell, one or more reference signals for beam refinement for the second cell, or both.

In some examples, the second control signal further indicates one or more cells for the UE to deactivate. In some examples, the second control signal indicates one or more L1 measurement identifiers and reporting configurations corresponding to the one or more cells for the UE to deactivate, one or more TRPs associated with the one or more cells for the UE to deactivate, or a combination thereof.

In some examples, the second control signal includes an LCID indicating that the second control signal configures the UE to switch the SpCell from the first cell to the second cell. In some other examples, the second control signal corresponds to a DCI format indicating that the second control signal configures the UE to switch the SpCell from the first cell to the second cell.

In some examples, the second control signal further includes a set of reserved bits indicating which fields are present within the second control signal, indicating for the UE to deactivate the first cell configured as the SpCell for communication, indicating for the UE to maintain the first cell configured as the SpCell for communication as active, or a combination thereof.

In some examples, the first control signal includes an RRC signal. In some examples, the second control signal includes a MAC-CE, a DCI signal, or both.

Figure 14:
FIG. 14 shows a diagram of a system including a device that supports control signaling for SpCell mobility in accordance with one or more aspects of the present disclosure.

FIG. 14 shows a diagram of a system 1400 including a device 1405 that supports control signaling for SpCell mobility in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting control signaling for SpCell mobility). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405 and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105 and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 may be configured as or otherwise support a means for transmitting a first control signal configuring a set of multiple cells supporting mobility for a UE. The first control signal may configure a first cell of the set of multiple cells as an SpCell for communication for the UE. The communications manager 1420 may be configured as or otherwise support a means for transmitting a second control signal indicating for the UE to update the SpCell for communication from the first cell to a second cell of the set of multiple cells and indicating a pTRP for activation for the second cell. The communications manager 1420 may be configured as or otherwise support a means for communicating via the pTRP for the second cell based on the second control signal.

By including or configuring the communications manager 1420 in accordance with examples as described herein, the device 1405 may support techniques for reduced latency and signaling overhead associated with updating an SpCell at a UE 115. For example, the device 1405 may use L1 signaling, L2 signaling, or both to update an SpCell, which may improve SpCell mobility and flexibility as compared to using L3 signaling for SpCell reconfiguration or handover.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of control signaling for SpCell mobility as described herein, or the processor 1435 and the memory 1425 may be otherwise configured to perform or support such operations.

FIG. 15 shows a flowchart illustrating a method 1500 that supports control signaling for SpCell mobility in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a first control signal indicating a configuration of a set of multiple cells supporting mobility for the UE. The first control signal may configure a first cell of the set of multiple cells as an SpCell for communication. The operations of 1505 may be performed in accordance with examples as disclosed herein. In some examples, aspects of the operations of 1505 may be performed by a cell configuration component 925 as described with reference to FIG. 9.

At 1510, the method may include receiving a second control signal indicating to update the SpCell for communication from the first cell to a second cell of the set of multiple cells and indicating a pTRP for activation for the second cell. The operations of 1510 may be performed in accordance with examples as disclosed herein. In some examples, aspects of the operations of 1510 may be performed by an SpCell mobility component 930 as described with reference to FIG. 9.

At 1515, the method may include communicating with the second cell via the pTRP based on the second control signal. The operations of 1515 may be performed in accordance with examples as disclosed herein. In some examples, aspects of the operations of 1515 may be performed by a communication component 935 as described with reference to FIG. 9.

FIG. 16 shows a flowchart illustrating a method 1600 that supports control signaling for SpCell mobility in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a first control signal indicating a configuration of a set of multiple cells supporting mobility for the UE. A first cell of the set of multiple cells may be an SpCell for communication. The operations of 1605 may be performed in accordance with examples as disclosed herein. In some examples, aspects of the operations of 1605 may be performed by a cell configuration component 925 as described with reference to FIG. 9.

At 1610, the method may include receiving a second control signal indicating to update the SpCell for communication from the first cell to a second cell of the set of multiple cells and indicating a pTRP for activation for the second cell. The second control signal may further indicate an SpCell configuration. The operations of 1610 may be performed in accordance with examples as disclosed herein. In some examples, aspects of the operations of 1610 may be performed by an SpCell mobility component 930 as described with reference to FIG. 9.

At 1615, the method may include activating a configuration for the SpCell from a set of multiple configurations available for the second cell based on the second control signal. The operations of 1615 may be performed in accordance with examples as disclosed herein. In some examples, aspects of the operations of 1615 may be performed by an SpCell configuration component 940 as described with reference to FIG. 9.

At 1620, the method may include communicating with the second cell via the pTRP based on the second control signal and the activated configuration for the SpCell. The operations of 1620 may be performed in accordance with examples as disclosed herein. In some examples, aspects of the operations of 1620 may be performed by a communication component 935 as described with reference to FIG. 9.

FIG. 17 shows a flowchart illustrating a method 1700 that supports control signaling for SpCell mobility in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a first control signal indicating a configuration of a set of multiple cells supporting mobility for the UE, where a first cell of the set of multiple cells is an SpCell for communication. The operations of 1705 may be performed in accordance with examples as disclosed herein. In some examples, aspects of the operations of 1705 may be performed by a cell configuration component 925 as described with reference to FIG. 9.

At 1710, the method may include receiving a second control signal indicating to update the SpCell for communication from the first cell to a second cell of the set of multiple cells and indicating a pTRP for activation for the second cell. The operations of 1710 may be performed in accordance with examples as disclosed herein. In some examples, aspects of the operations of 1710 may be performed by an SpCell mobility component 930 as described with reference to FIG. 9.

At 1715, the method may include activating one or more TRPs associated with the set of multiple cells based on the second control signal including a bit map for TRP activation. The operations of 1715 may be performed in accordance with examples as disclosed herein. In some examples, aspects of the operations of 1715 may be performed by a TRP activation component 960 as described with reference to FIG. 9.

At 1720, the method may include deactivating one or more other TRPs associated with the set of multiple cells based on the bit map for TRP activation. The operations of 1720 may be performed in accordance with examples as disclosed herein. In some examples, aspects of the operations of 1720 may be performed by a TRP deactivation component 965 as described with reference to FIG. 9.

At 1725, the method may include communicating with the second cell via the pTRP based on the second control signal. The operations of 1725 may be performed in accordance with examples as disclosed herein. In some examples, aspects of the operations of 1725 may be performed by a communication component 935 as described with reference to FIG. 9.

FIG. 18 shows a flowchart illustrating a method 1800 that supports control signaling for SpCell mobility in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first control signal configuring a set of multiple cells supporting mobility for a UE, where a first cell of the set of multiple cells is an SpCell for communication for the UE. The operations of 1805 may be performed in accordance with examples as disclosed herein. In some examples, aspects of the operations of 1805 may be performed by a cell configuration transmission component 1325 as described with reference to FIG. 13.

At 1810, the method may include transmitting a second control signal indicating for the UE to update the SpCell for communication from the first cell to a second cell of the set of multiple cells and indicating a pTRP for activation for the second cell. The operations of 1810 may be performed in accordance with examples as disclosed herein. In some examples, aspects of the operations of 1810 may be performed by an SpCell mobility indicating component 1330 as described with reference to FIG. 13.

At 1815, the method may include communicating via the pTRP for the second cell based on the second control signal. The operations of 1815 may be performed in accordance with examples as disclosed herein. In some examples, aspects of the operations of 1815 may be performed by a communication component 1335 as described with reference to FIG. 13.

The following provides an overview of aspects of the present disclosure:

Aspect 1: A method for wireless communications at a UE, comprising: receiving a first control signal indicating a configuration of a plurality of cells supporting mobility for the UE, a first cell of the plurality of cells is a special cell for communication; receiving a second control signal indicating to update the special cell for communication from the first cell to a second cell of the plurality of cells and indicating a primary transmission/reception point for activation for the second cell; and communicating with the second cell via the primary transmission/reception point based at least in part on the second control signal.

Aspect 2: The method of aspect 1, wherein the second control signal further indicates a configuration for the special cell, the method further comprising: activating the configuration for the special cell from a plurality of configurations available for the second cell based at least in part on the second control signal, wherein the communicating is further based at least in part on the activated configuration for the special cell.

Aspect 3: The method of any of aspects 1 through 2, wherein the second cell is deactivated based at least in part on the first control signal and the second control signal further indicates an identifier of a channel state information reference signal for tracking based at least in part on the second cell being deactivated, the method further comprising: activating the second cell in response to receiving the second control signal; and performing beam refinement for the second cell based at least in part on the identifier of the channel state information reference signal for tracking.

Aspect 4: The method of aspect 3, wherein the identifier of the channel state information reference signal for tracking corresponds to a plurality of transmission/reception points for the second cell; and the identifier of the channel state information reference signal for tracking indicates one or more transmission configuration indicator states to activate for the second cell, one or more reference signals for beam refinement for the second cell, or both.

Aspect 5: The method of any of aspects 1 through 4, further comprising: deactivating one or more cells based at least in part on the second control signal further indicating the one or more cells to deactivate.

Aspect 6: The method of aspect 5, wherein the second control signal indicates one or more layer one measurement identifiers and reporting configurations corresponding to the one or more cells to deactivate, one or more transmission/reception points associated with the one or more cells to deactivate, or a combination thereof.

Aspect 7: The method of any of aspects 5 through 6, wherein deactivating the one or more cells comprises: deactivating a plurality of transmission/reception points associated with the one or more cells.

Aspect 8: The method of any of aspects 1 through 7, further comprising: activating one or more additional transmission/reception points associated with the second cell based at least in part on the second control signal indicating to update the special cell for communication with the second cell.

Aspect 9: The method of any of aspects 1 through 7, further comprising: activating one or more transmission/reception points associated with the plurality of cells based at least in part on the second control signal comprising a bit map for transmission/reception point activation.

Aspect 10: The method of aspect 9, further comprising: deactivating one or more other transmission/reception points associated with the plurality of cells based at least in part on the bit map for transmission/reception point activation.

Aspect 11: The method of any of aspects 1 through 10, wherein the second control signal comprises a logical channel identifier indicating that the second control signal configures the UE to switch the special cell from the first cell to the second cell; or the second control signal corresponds to a downlink control information format indicating that the second control signal configures the UE to switch the special cell from the first cell to the second cell.

Aspect 12: The method of any of aspects 1 through 11, wherein the second control signal further comprises a set of reserved bits indicating which fields are present within the second control signal, indicating to deactivate the first cell configured as the special cell for communication, indicating to maintain the first cell configured as the special cell for communication as active, or a combination thereof.

Aspect 13: The method of any of aspects 1 through 12, wherein the first control signal configures a first primary transmission/reception point for the second cell from a plurality of transmission/reception points associated with the second cell; and the primary transmission/reception point for activation for the second cell indicated using the second control signal comprises a second primary transmission/reception point from the plurality of transmission/reception points different from the first primary transmission/reception point.

Aspect 14: The method of any of aspects 1 through 13, wherein the first control signal comprises a radio resource control signal; and the second control signal comprises a medium access control control element, a downlink control information signal, or both.

Aspect 15: A method for wireless communications at a network entity, comprising: transmitting a first control signal configuring a plurality of cells supporting mobility for a UE, a first cell of the plurality of cells is a special cell for communication for the UE; transmitting a second control signal indicating for the UE to update the special cell for communication from the first cell to a second cell of the plurality of cells and indicating a primary transmission/reception point for activation for the second cell; and communicating via the primary transmission/reception point for the second cell based at least in part on the second control signal.

Aspect 16: The method of aspect 15, wherein the second control signal further indicates a configuration for the special cell, the method further comprising: activating the configuration for the special cell from a plurality of configurations available for the second cell based at least in part on the second control signal, wherein the communicating is further based at least in part on the activated configuration for the special cell.

Aspect 17: The method of any of aspects 15 through 16, further comprising: generating a bit map for transmission/reception point activation indicating one or more transmission/reception points associated with the plurality of cells for the UE to activate, wherein the second control signal further comprises the bit map.

Aspect 18: The method of aspect 17, wherein the bit map further indicates one or more other transmission/reception points associated with the plurality of cells for the UE to deactivate.

Aspect 19: The method of any of aspects 15 through 18, wherein the second cell is deactivated for the UE based at least in part on the first control signal; and the second control signal further indicates an identifier of a channel state information reference signal for tracking based at least in part on the second cell being deactivated for the UE.

Aspect 20: The method of aspect 19, wherein the identifier of the channel state information reference signal for tracking corresponds to a plurality of transmission/reception points for the second cell; and the identifier of the channel state information reference signal for tracking indicates one or more transmission configuration indicator states to activate for the second cell, one or more reference signals for beam refinement for the second cell, or both.

Aspect 21: The method of any of aspects 15 through 20, wherein the second control signal further indicates one or more cells for the UE to deactivate.

Aspect 22: The method of aspect 21, wherein the second control signal indicates one or more layer one measurement identifiers and reporting configurations corresponding to the one or more cells for the UE to deactivate, one or more transmission/reception points associated with the one or more cells for the UE to deactivate, or a combination thereof.

Aspect 23: The method of any of aspects 15 through 22, wherein the second control signal comprises a logical channel identifier indicating that the second control signal configures the UE to switch the special cell from the first cell to the second cell; or the second control signal corresponds to a downlink control information format indicating that the second control signal configures the UE to switch the special cell from the first cell to the second cell.

Aspect 24: The method of any of aspects 15 through 23, wherein the second control signal further comprises a set of reserved bits indicating which fields are present within the second control signal, indicating for the UE to deactivate the first cell configured as the special cell for communication, indicating for the UE to maintain the first cell configured as the special cell for communication as active, or a combination thereof.

Aspect 25: The method of any of aspects 15 through 24, wherein the first control signal comprises a radio resource control signal; and the second control signal comprises a medium access control control element, a downlink control information signal, or both.

Aspect 26: An apparatus for wireless communications at a UE, comprising a processor; memory coupled with the processor; and instructions stored in the memory and executable by the processor to cause the apparatus to perform a method of any of aspects 1 through 14.

Aspect 27: An apparatus for wireless communications at a UE, comprising at least one means for performing a method of any of aspects 1 through 14.

Aspect 28: A non-transitory computer-readable medium storing code for wireless communications at a UE, the code comprising instructions executable by a processor to perform a method of any of aspects 1 through 14.

Aspect 29: An apparatus for wireless communications at a network entity, comprising a processor; memory coupled with the processor; and instructions stored in the memory and executable by the processor to cause the apparatus to perform a method of any of aspects 15 through 25.

Aspect 30: An apparatus for wireless communications at a network entity, comprising at least one means for performing a method of any of aspects 15 through 25.

Aspect 31: A non-transitory computer-readable medium storing code for wireless communications at a network entity, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor;
   at least one memory coupled with the at least one processor; and
   instructions stored in the at least one memory and executable by the at least one processor to cause the apparatus to:
      receive a first control signal indicating a configuration of a plurality of cells supporting mobility for the UE, a first cell of the plurality of cells being a special cell for communication;
      receive a second control signal indicating to update the special cell for communication from the first cell to a second cell of the plurality of cells, the second control signal comprising:
         a first field that comprises a cell identifier indicating the second cell,
         a second field that comprises an index indicating a primary transmission/reception point for activation for the second cell, and

a third field that comprises an identifier of a channel state information reference signal for tracking indicating one or more transmission configuration indicator states for activation for the second cell; and communicate with the second cell via the primary transmission/reception point in accordance with a transmission configuration indicator state of the one or more transmission configuration indicator states based at least in part on the second control signal.

2. The apparatus of claim 1, wherein the second control signal further comprises a fourth field that comprises a configuration identifier indicating a configuration for the special cell, and the instructions are further executable by the at least one processor to cause the apparatus to:

activate the configuration for the special cell from a plurality of configurations available for the second cell based at least in part on the second control signal, wherein the communicating is further based at least in part on the activated configuration for the special cell.

3. The apparatus of claim 1, wherein the second cell is deactivated based at least in part on the first control signal and the second control signal comprises the third field that comprises the identifier of the channel state information reference signal for tracking based at least in part on the second cell being deactivated, and the instructions are further executable by the at least one processor to cause the apparatus to:

activate the second cell in response to receiving the second control signal; and perform beam refinement for the second cell based at least in part on the identifier of the channel state information reference signal for tracking.

4. The apparatus of claim 3, wherein:

the identifier of the channel state information reference signal for tracking corresponds to a plurality of transmission/reception points for the second cell; and the identifier of the channel state information reference signal for tracking indicates the one or more transmission configuration indicator states to activate for the second cell, one or more reference signals for beam refinement for the second cell, or both.

5. The apparatus of claim 1, wherein the instructions are further executable by the at least one processor to cause the apparatus to:

deactivate one or more cells based at least in part on the second control signal further indicating the one or more cells to deactivate.

6. The apparatus of claim 5, wherein the second control signal indicates one or more layer one measurement identifiers and reporting configurations corresponding to the one or more cells to deactivate, one or more transmission/reception points associated with the one or more cells to deactivate, or a combination thereof.

7. The apparatus of claim 5, wherein the instructions to deactivate the one or more cells are executable by the at least one processor to cause the apparatus to:

deactivate a plurality of transmission/reception points associated with the one or more cells.

8. The apparatus of claim 1, wherein the instructions are further executable by the at least one processor to cause the apparatus to:

activate one or more additional transmission/reception points associated with the second cell based at least in part on the second control signal indicating to update the special cell for communication with the second cell.

9. The apparatus of claim 1, wherein the instructions are further executable by the at least one processor to cause the apparatus to:

activate one or more transmission/reception points associated with the plurality of cells based at least in part on the second control signal comprising a bit map for transmission/reception point activation.

10. The apparatus of claim 9, wherein the instructions are further executable by the at least one processor to cause the apparatus to:

deactivate one or more other transmission/reception points associated with the plurality of cells based at least in part on the bit map for transmission/reception point activation.

11. The apparatus of claim 1, wherein:

the second control signal comprises a logical channel identifier indicating that the second control signal configures the UE to switch the special cell from the first cell to the second cell; or the second control signal corresponds to a downlink control information format indicating that the second control signal configures the UE to switch the special cell from the first cell to the second cell.

12. The apparatus of claim 1, wherein the second control signal further comprises a set of reserved bits indicating which fields are present within the second control signal, indicating to deactivate the first cell configured as the special cell for communication, indicating to maintain the first cell configured as the special cell for communication as active, or a combination thereof.

13. The apparatus of claim 1, wherein:

the first control signal configures a first primary transmission/reception point for the second cell from a plurality of transmission/reception points associated with the second cell; and the primary transmission/reception point for activation for the second cell indicated using the second control signal comprises a second primary transmission/reception point from the plurality of transmission/reception points different from the first primary transmission/reception point.

14. The apparatus of claim 1, wherein:

the first control signal comprises a radio resource control signal; and the second control signal comprises a downlink control information signal.

15. The apparatus of claim 1, wherein:

the first control signal comprises a radio resource control signal; and the second control signal comprises a medium access control control element.

16. An apparatus for wireless communications, comprising:

at least one processor;

at least one memory coupled with the at least one processor, and instructions stored in the at least one memory and executable by the at least one processor to cause the apparatus to:

transmit a first control signal configuring a plurality of cells supporting mobility for a user equipment (UE), a first cell of the plurality of cells being a special cell for communication for the UE;

transmit a second control signal indicating for the UE to update the special cell for communication from the first cell to a second cell of the plurality of cells, the second control signal comprising:

a first field that comprises a cell identifier indicating the second cell, a second field that comprises an index indicating a primary transmission/reception point for activation for the second cell, and a third field that comprises an identifier of a channel state information reference signal for tracking indicating one or more transmission configuration indicator states for activation for the second cell; and communicate via the primary transmission/reception point for the second cell in accordance with a transmission configuration indicator state of the one or more transmission configuration indicator states based at least in part on the second control signal.

17. The apparatus of claim 16, wherein the second control signal further comprises a fourth field that comprises a configuration identifier indicating a configuration for the special cell, and the instructions are further executable by the at least one processor to cause the apparatus to:

activate the configuration for the special cell from a plurality of configurations available for the second cell based at least in part on the second control signal, wherein the communicating is further based at least in part on the activated configuration for the special cell.

18. The apparatus of claim 16, wherein the instructions are further executable by the at least one processor to cause the apparatus to:

generate a bit map for transmission/reception point activation indicating one or more transmission/reception points associated with the plurality of cells for the UE to activate, wherein the second control signal further comprises the bit map.

19. The apparatus of claim 18, wherein the bit map further indicates one or more other transmission/reception points associated with the plurality of cells for the UE to deactivate.

20. The apparatus of claim 16, wherein:

the second cell is deactivated for the UE based at least in part on the first control signal; and the second control signal comprises the third field that comprises the identifier of the channel state information reference signal for tracking based at least in part on the second cell being deactivated for the UE.

21. The apparatus of claim 20, wherein:

the identifier of the channel state information reference signal for tracking corresponds to a plurality of transmission/reception points for the second cell; and the identifier of the channel state information reference signal for tracking indicates the one or more transmission configuration indicator states to activate for the second cell, one or more reference signals for beam refinement for the second cell, or both.

22. The apparatus of claim 16, wherein the second control signal further indicates one or more cells for the UE to deactivate.

23. The apparatus of claim 22, wherein the second control signal indicates one or more layer one measurement identifiers and reporting configurations corresponding to the one or more cells for the UE to deactivate, one or more transmission/reception points associated with the one or more cells for the UE to deactivate, or a combination thereof.

24. The apparatus of claim 16, wherein:

the second control signal comprises a logical channel identifier indicating that the second control signal configures the UE to switch the special cell from the first cell to the second cell; or

54 the second control signal corresponds to a downlink control information format indicating that the second control signal configures the UE to switch the special cell from the first cell to the second cell.

25. The apparatus of claim 16, wherein the second control signal further comprises a set of reserved bits indicating which fields are present within the second control signal, indicating for the UE to deactivate the first cell configured as the special cell for communication, indicating for the UE to maintain the first cell configured as the special cell for communication as active, or a combination thereof.

26. The apparatus of claim 16, wherein:

the first control signal comprises a radio resource control signal; and the second control signal comprises a downlink control information signal.

27. The apparatus of claim 16, wherein:

the first control signal comprises a radio resource control signal; and the second control signal comprises a medium access control control element.

28. A method for wireless communications at a user equipment (UE), comprising:

receiving a first control signal indicating a configuration of a plurality of cells supporting mobility for the UE, a first cell of the plurality of cells being a special cell for communication;

receiving a second control signal indicating to update the special cell for communication from the first cell to a second cell of the plurality of cells, the second control signal comprising:

a first field that comprises a cell identifier indicating the second cell, a second field that comprises an index indicating a primary transmission/reception point for activation for the second cell, and a third field that comprises an identifier of a channel state information reference signal for tracking indicating one or more transmission configuration indicator states for activation for the second cell; and communicating with the second cell via the primary transmission/reception point in accordance with a transmission configuration indicator state of the one or more transmission configuration indicator states based at least in part on the second control signal.

29. The method of claim 28, wherein the second control signal further comprises a fourth field that comprises a configuration identifier indicating a configuration for the special cell, the method further comprising:

activating the configuration for the special cell from a plurality of configurations available for the second cell based at least in part on the second control signal, wherein the communicating is further based at least in part on the activated configuration for the special cell.

30. A method for wireless communications, comprising:

transmitting a first control signal configuring a plurality of cells supporting mobility for a user equipment (UE), a first cell of the plurality of cells being a special cell for communication for the UE;

transmitting a second control signal indicating for the UE to update the special cell for communication from the first cell to a second cell of the plurality of cells, the second control signal comprising:

a first field that comprises a cell identifier indicating the second cell, a second field that comprises an index indicating a primary transmission/reception point for activation for the second cell, and a third field that comprises an identifier of a channel state information reference signal for tracking indicating one or more transmission configuration indicator states for activation for the second cell; and communicating via the primary transmission/reception point for the second cell in accordance with a transmission configuration indicator state of the one or more transmission configuration indicator states based at least in part on the second control signal.

* * * * *